United States Patent [19]
Fantone et al.

[11] Patent Number: 5,823,344
[45] Date of Patent: Oct. 20, 1998

[54] DISPLAY SYSTEMS WITH MULTIPLE VIEW OPTICS

[75] Inventors: Stephen D. Fantone, Lynnfield, Mass.; Anthony L. Gelardi, Cape Porpoise; John A. Gelardi, Kennebunkport, both of Me.

[73] Assignee: Insight, Inc., Lynnfield, Mass.

[21] Appl. No.: 778,975

[22] Filed: Jan. 6, 1997

Related U.S. Application Data

[63] Continuation-in-part of Ser. No. 508,380, Jul. 31, 1995, and Ser. No. 772,968, Dec. 23, 1996.

[51] Int. Cl.⁶ .................................................... B65D 85/00
[52] U.S. Cl. .................. 206/459.5; 206/232; 206/387.1; 40/436; 40/453
[58] Field of Search ..................................... 206/232, 307, 206/308.1, 309, 310, 311, 312, 387.1, 387.14, 459.5; 40/436, 453, 454, 642.02, 649, 651, 668, 312

[56] References Cited

U.S. PATENT DOCUMENTS

| | | |
|---|---|---|
| 2,833,176 | 5/1958 | Ossoinak . |
| 3,321,855 | 5/1967 | Phelps ........................................ 40/651 |
| 3,568,346 | 3/1971 | Smith . |
| 3,849,917 | 11/1974 | Bergh et al. .............................. 40/649 |
| 3,953,958 | 5/1976 | Lo et al. . |
| 3,973,958 | 8/1976 | Bean . |
| 4,044,889 | 8/1977 | Orentreich et al. . |
| 4,120,562 | 10/1978 | Lo et al. . |
| 4,158,501 | 6/1979 | Smith et al. . |
| 4,255,380 | 3/1981 | Bjorkland . |
| 4,420,221 | 12/1983 | Sparks . |
| 4,480,893 | 11/1984 | Fantone . |
| 4,600,297 | 7/1986 | Winnek . |
| 4,863,026 | 9/1989 | Perkowski . |
| 4,869,946 | 9/1989 | Clay . |
| 4,903,069 | 2/1990 | Lam . |
| 4,947,989 | 8/1990 | Horton ....................................... 40/312 |
| 5,018,291 | 5/1991 | Pasquale et al. . |
| 5,146,703 | 9/1992 | Boden . |
| 5,174,054 | 12/1992 | Politi . |
| 5,276,478 | 1/1994 | Morton . |
| 5,388,713 | 2/1995 | Taniyama . |
| 5,448,844 | 9/1995 | Miller, Jr. et al. ........................ 40/312 |
| 5,494,445 | 2/1996 | Sekiguichi et al. . |
| 5,542,531 | 8/1996 | Yeung . |

FOREIGN PATENT DOCUMENTS 2222143  2/1980  United Kingdom .

*Primary Examiner*—David T. Fidei
*Attorney, Agent, or Firm*—Francis J. Caufield

[57] ABSTRACT

Optical, printing, and fabrication arrangements are provided by which observers of flat containers or display boxes, such as video and audio tape cassettes or compact disc (CD) jewel boxes, can be presented with different information when looking at one of the box's surfaces from different angular perspectives. Advantageously, parallax effects are compensated where the size of the observable images and the viewing distance create undesirable visual artifacts. Horizontally and vertically oriented lenticulated panels are used in combination with interlaced images to convey the differently coded views without the need for physically manipulating such boxes as in the past to see equivalent information. Printed informational inserts or box surfaces are provided with interlaced images and reference surfaces for alignment purposes which is achieved either with control of fit or via resiliently flexible arrangements for urging the images and optics into positions of proper alignment. These arrangements enhance the possibilities for displaying more and different kinds of information on a given box or display surface area compared with conventional approaches and may be used to enhance the prospects for increasing sales of products and displaying sporting figures, celebrities, animation, graphics, textual messages, special visual effects, or the like.

25 Claims, 25 Drawing Sheets

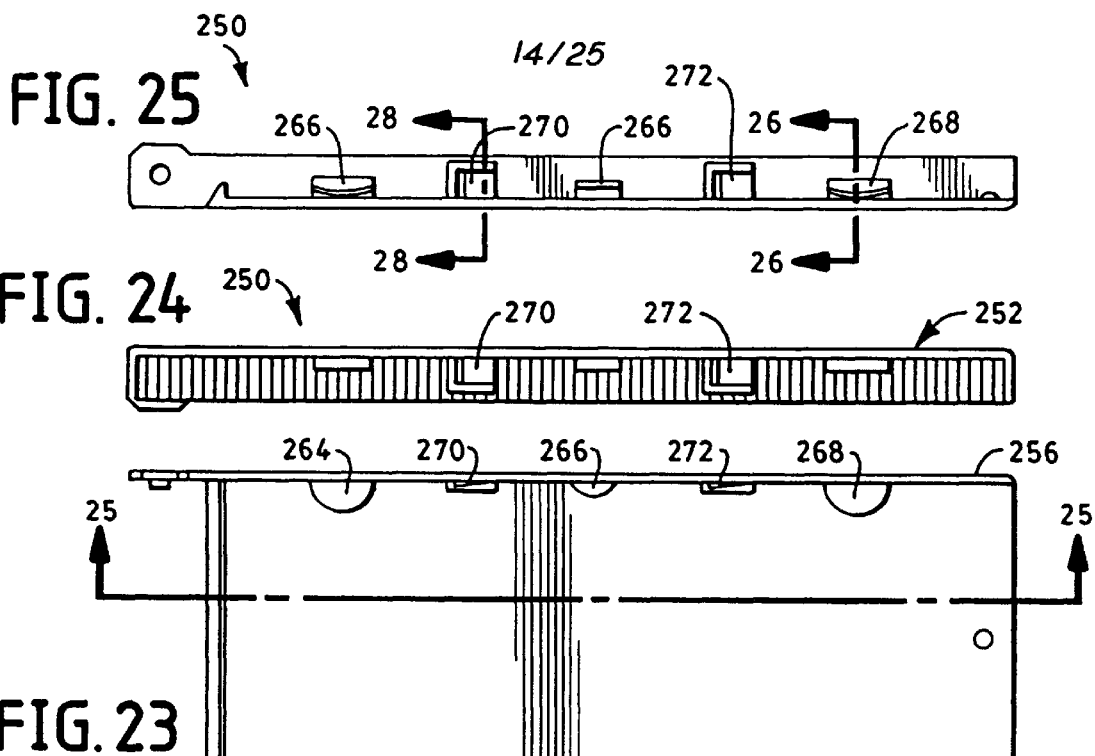
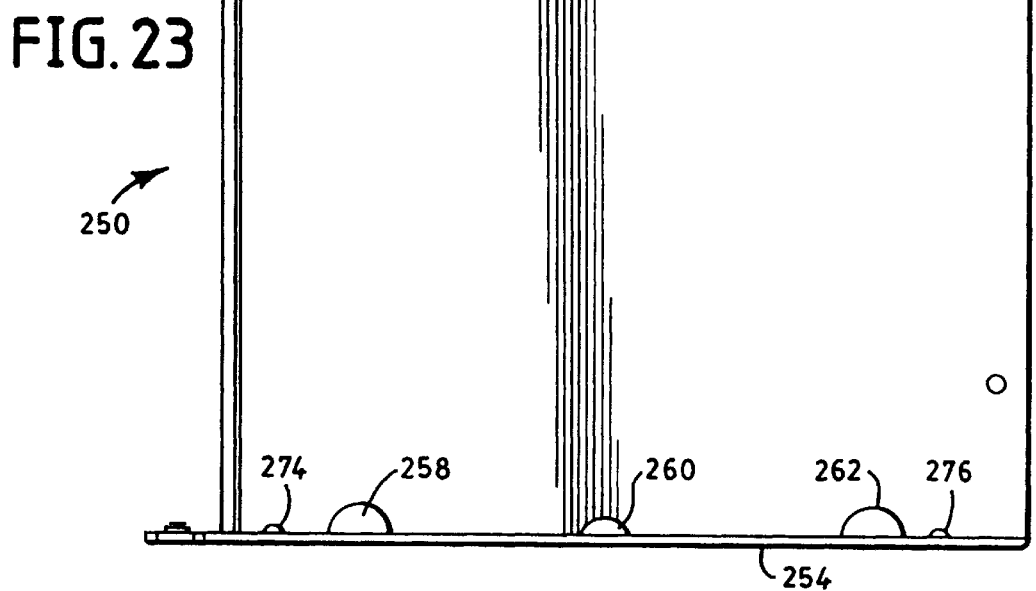
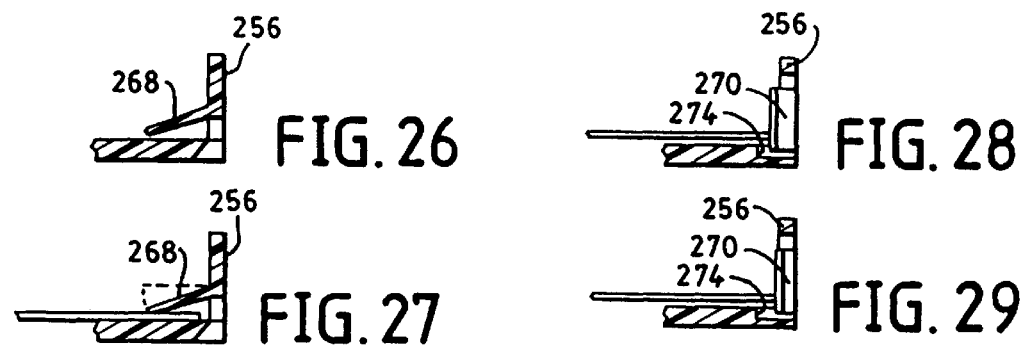

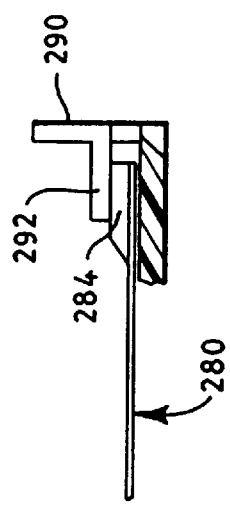
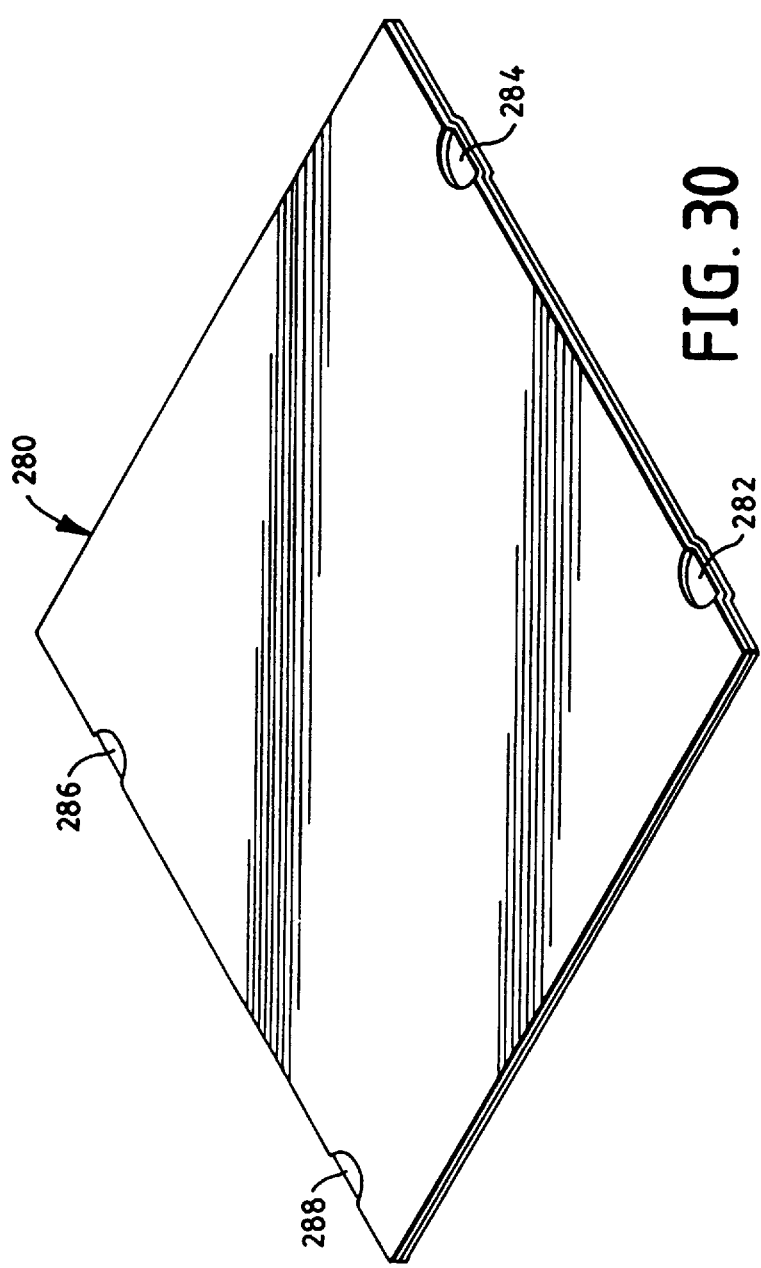

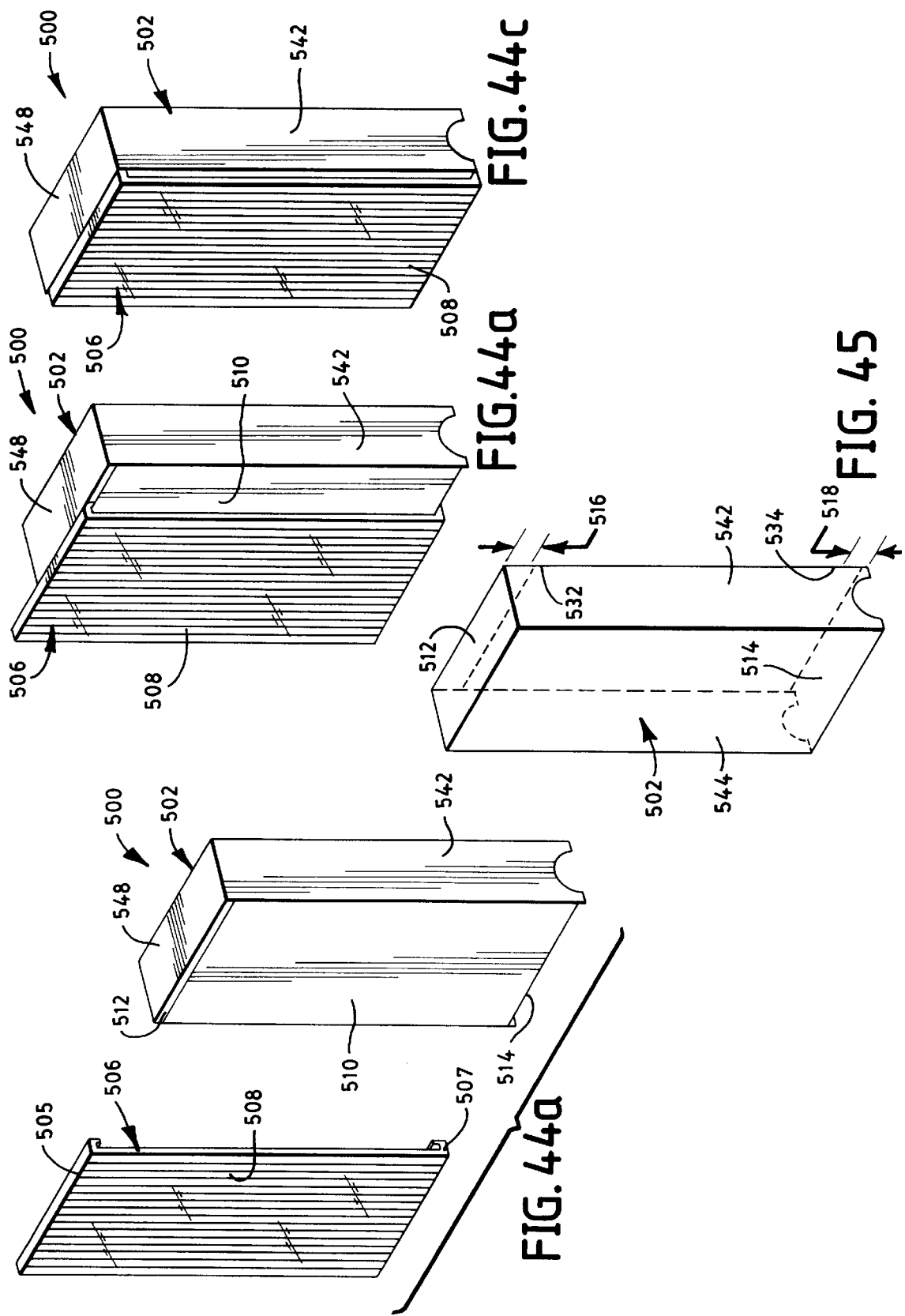

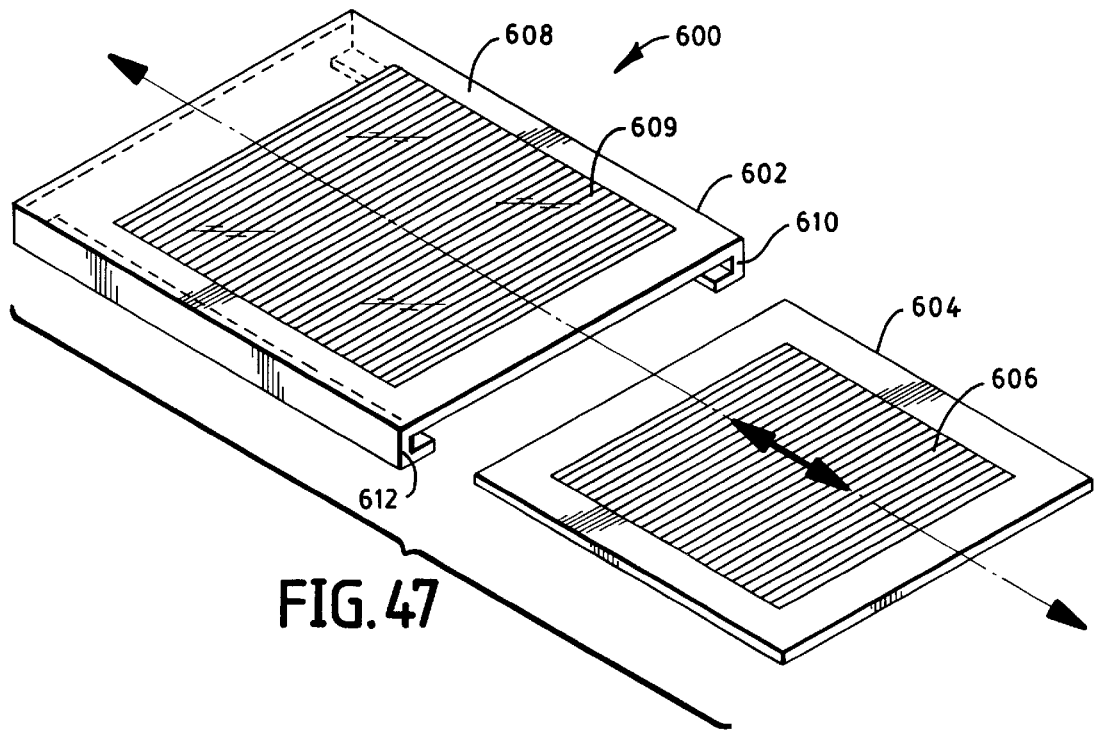
FIG. 47
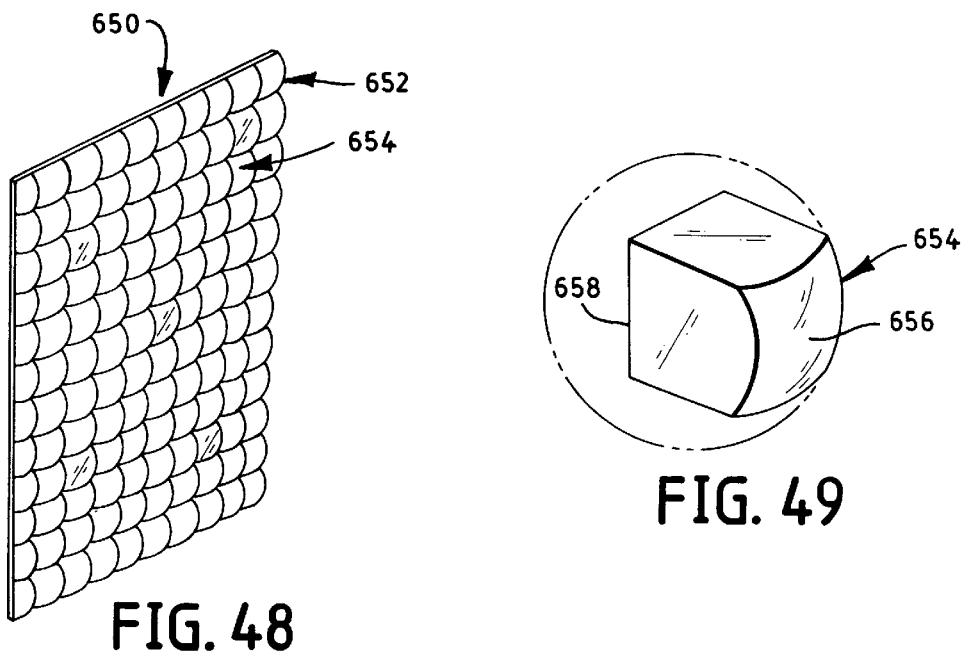
FIG. 48
FIG. 49

DISPLAY SYSTEMS WITH MULTIPLE VIEW OPTICS

CROSS REFERENCE TO RELATED APPLICATION

This application is a continuation-in-part application of U.S. patent application Ser. No. 08/508,380 filed on Jul. 31, 1995 and U.S. patent application Ser. No. 08/772,968 filed on Dec. 23, 1996, both commonly owned herewith.

BACKGROUND OF THE INVENTION

1. Field of the Invention

This invention relates generally to storage and display boxes, display frames, and, more particularly, to optical arrangements for providing enhanced viewing of textual, graphic, and/or other symbolically coded information located on or inside of storage and/or display boxes for merchandise such as compact discs, video tapes, audio tapes, or the like.

2. Description of the Prior Art

With continuous improvements in digital storage media and recording technology, it is increasingly possible to store more and more information, particularly image, video, multimedia, and audio information, in smaller and smaller physical space. More recently, multimedia and even digital video of feature length motion pictures have become a reality. As the physical size of such media shrinks, it has been a challenge to provide packaging and advertising materials of some sensible scale which permit a potential customer to learn about the contents stored in the media while at the same time not occupying too much retail shelf space and otherwise attracting customer attention. One important digital media for such storage applications is the compact disc, although magnetic media in the form of discs and tapes is also still an important storage media of significant market size.

Compact discs, which were first developed by Philips and Sony in the early 1980s, are now a well-established form of medium for recording a variety of retrievable information. Their popularity and success stem from their compactness, convenience, competitive cost, and high information storing capacity.

Physically, such discs are thin, flat, circular objects approximately 12 cm in diameter by about 1.2 mm thick. They are provided with a central hole about 18 mm in diameter for purposes of mounting them for rotation in various devices capable of exchanging information with them, usually by electro-optical means. Typically, audio, video or other data is recorded in digital form on one surface of the disc with the opposite remaining free for carrying information about the contents of the recorded information.

For enabling writing and recording information, a compact disc (CD) comprises a clear plastic layer over a reflective aluminum surface. Data, of whatever type, is stored on the disc in binary code; the 'ones' of the code being dents or pits in the plastic surface while the 'zeros' are represented by smooth plastic. When playing the disc, a laser beam scans the disc surface as it rotates and is reflected back only by the 'zero' areas. Reflected light pulses are picked up by a photodetector which converts them into a digital electrical signal that can then be further processed for subsequent use in various playback devices appropriate for the type of information recorded in the disc.

While very popular for audio recording, CDS also can be used for storing video and multimedia information, which applies the same technology. These have advantages over magnetic tape by virtue of being easier to replicate and randomly access.

CDS are also used to store large amounts of computer information. Here, CD-ROM (compact disc with read-only memory) is the most common format, but other forms of disc are available that allow data to be written on the disc as well as read from it.

Recent applications for CD use include the photo-CD, which records still images for viewing on a television screen or reproduction as hard copy, and the multimedia CD, which holds pictures, sound, and text information on one disc and can play it back through television receivers and hi-fi equipment or appropriately configured computer systems.

While CDS are physically robust because information is digitally encoded and optically read, they obviously are not immune to damage and require protection from mishandling and environmental effects which could destroy or compromise their information bearing surfaces or otherwise threaten their physical integrity.

Consequently, CDS are usually shipped, stored and marketed in correspondingly flat containers referred to as "jewel boxes". Such boxes are generally made of a durable, transparent plastic such as polycarbonate or styrene and have been designed to occupy the minimal amount of space consistent with their protective function. As a result of this, and the fact that CDS can carry so much digitally encoded information, space available on the surfaces of the jewel box for providing information about their contents is at a premium, especially since the practice of packaging CDS with "spaghetti" boxes has been discontinued because of environmental pressures associated with the accumulated waste from the sale of large volumes of CDS.

Since the disappearance of the spaghetti box from the marketplace, the current technique for informing CD users about the contents of recorded CD information is to provide the information in the form of thin paper booklets or sheets that are visible through the flat, transparent panels of a jewel boxes' front cover or base, or both. In addition, use is also made of the hinge edge of a box for displaying cryptic information about the title and author or artist of the CD. However, the limited exterior surface area of the conventional CD box, in turn, limits the amount of information that can be seen through any one surface thus requiring relevant information to be distributed among available surfaces. This forces a prospective buyer to flip through stacks of CDS while scanning the front covers in search of the identity of a particular CD, usually by title and/or artist, that may be of interest and then turning the box around to examine the rear surface for information about the detailed contents. Studies have shown that this results in the loss of multiple, and perhaps primary, sales because the process is time consuming and frustrating for the consumer. Hence, there is a need for a solution to the foregoing problems, and it is a primary object of this invention to provide solutions through the use of optical arrangements which enhance the viewing opportunities and amount of information that can be visually detected by a prospective purchaser of packaged information storage media, especially CDS, video, and audio tapes.

While optical approaches have been used in the past for direct magnification of content information about the insides of containers, none have provided more visual access to more information on the same viewable area or, more importantly, different information viewable through the same box surface. For example, British Patent No. GB 2222143 entitled "BOX-LIKE CONTAINER" published on Feb. 28, 1990 discloses the use of a plano-convex, positive cylindrical lens arranged along the hinge edge of a tape cassette or compact disc box for purposes of providing magnification of informational matter carried directly behind it.

U.S. Pat. No. 4,863,026 entitled "STORAGE CASES FOR INFORMATION RECORDING DEVICES", issued on Sep. 5, 1989 discloses a Fresnel lens incorporated in or on the front cover panel of a case for purposes of magnifying information carried on the surface of a program card inserted in the case such that it lies directly beneath the lens. In like manner, U.S. Pat. No. 4,044,889 entitled "COSMETIC CONTAINER INCLUDING INTEGRATED LENS STRUCTURE", issued on Aug. 30, 1977, also shows a Fresnel lens for magnifying tiny underlying information carried on the interior of a cosmetic container.

U.S. Pat. No. 4,863,026 entitled "STORAGE CASES FOR INFORMATION RECORDING DEVICES", issued in the name of Thomas J. Perkowski on Sep. 5, 1989, discloses a Fresnel lens arranged on the front cover of a magnetic tape, video tape, or compact disc storage box for magnifying information located directly behind the front cover at an appropriate distance.

Similarly, U.S. Pat. No. 4,044,889 entitled "COSMETIC CONTAINER INCLUDING INTEGRATED LENS STRUCTURE", issued to Seymour Orentreich et al. on Aug. 30, 1977, describes the use of Fresnel lens structures for magnifying information located on the interior surfaces of cosmetic containers.

U.S. Pat. No. 5,189,531 entitled "HOLOGRAM PRODUCTION", issued to Charles E. Palmer et al. on Feb. 23, 1993, describes techniques for forming holographic images in cosmetic compact covers or compact audio or video discs or the like.

In view of the known art, there continues to be a demonstrable need for more effective ways of providing significantly improved visual access to flat storage containers and display boxes for purposes of informing prospective users about the contents of the containers and for making their contents more attractive to induce increased sales or, more simply, for displays, such as image frames, that are capable of providing multiple images viewable from different perspectives, stereograms, animations, and the like. And, it is a primary object of this invention to fulfill this need.

Another object of the present invention is to provide optical arrangements by which the viewable surfaces of flat containers or display frames may be exploited to provide views of different information or images by observing those surfaces from slightly different perspectives.

Yet another object of the present invention is to provide optical arrangements by which encoded information, multiple images, and stereo pairs may be provided on a viewable surface.

Still another object of the present invention is to provide optical arrangements by which pseudo-dynamic information may be provided to an observer of a flat container box or display frame.

Another object of the present invention is to provide an optical arrangement employing a lenticulated surface structured to compensate for parallax effects at customary viewing distances.

Yet still another object of the present invention is to provide printed informational materials such as box developments and the like, that can be folded into container boxes for informational media such as VHS video and audio tapes.

Still another object of the invention is to provide printing methods for fabricating printed developments that carry multiple interlaced images for use with lenticular screens.

Other objects of the invention will be apparent and will appear hereinafter in the following detailed description when read in connection with the drawings.

SUMMARY OF THE INVENTION

Optical and box printing and fabrication arrangements are provided by which observers of flat containers or display boxes, such as video and audio cassette boxes, compact disc (CD) jewel boxes, and display frames are presented with different information about the contents of the box in the form of multiple images, different images when looking at one of a box's surfaces from different angular perspectives, or autostereograms. Horizontally and vertically oriented lenticulated panels are used in combination with interlaced images to convey the differently coded views without the need for physically manipulating such boxes as in the past to see equivalent information. These arrangements enhance the possibilities for displaying more and different kinds of information on a given box or display surface area compared with conventional approaches, and as such, enhance the prospects for increasing initial and multiple sales of information media products and display frames for sports figures, family members, celebrities, animation, artwork, messages, and similar images or combinations of them.

The interlaced images preferably are carried on printed card inserts or box developments that are automatically optically registered with the lenticulated surfaces when a container system or frame is assembled. Whatever the means for presenting the interlaced images to the lenticulated surfaces used in the invention, it is important to align images and optics within tolerable limits with the axes and focal plane of the lenticules to assure image quality and crisp separation, although for special effects such as morphing, these requirements may be intentionally relaxed.

In preferred embodiments, the spatial frequency of the lenticulated panels and interlaced images are arranged with respect to one another to compensate for parallax effects which would otherwise be present when the flat panels are observed at customary viewing distances. Preferably, the spatial frequency of the interlaced images are adopted as fixed and the spatial frequency of the lenticulae is made higher by a factor approximately in the ratio of the viewing distances to their respective planes, adjusted for refraction effects of the lenticules themselves as needed.

In cases where printed images are intended to be removed from box containers, the interlaced images are preferably carried on multi paneled, printed, inserts that are folded to be compliant so that, when inserted into a box, they are resiliently urged to lie flat, within tolerances, against the plane containing the loci of focal lines of the lenticulae. Preferably, the panels of the inserts are adjusted in length so that when folded a bow is induced in the panel to provide it with a spring action when compressed or to assume a predetermined curve when free standing.

In addition to compliant printed inserts, arrangements utilizing mechanical resilient sections are disclosed which lift the printed inserts into the focal plane of the lenticules and otherwise align a reference edge of the printed insert against a reference line of the box to assure angular alignment of the interlaced images and the longitudinal axes of the lenticules.

Special snap, clip-on, or slide-on lenticular panels are disclosed for use with printed graphics and the like located on the exterior surfaces of a container box or the like. Here, alignment takes place automatically when the panel is attached to an exterior surface.

Multiple image displays, which include sporting figures or family members or the like, are disclosed. In these, alignment with the lenticules is preferably achieved by virtue of the fit provided between the printed insert and a compartment or channels adapted to receive the insert. Alternatively, the fit may be relaxed and the printed card mechanically forced into a registration position through the use of mechanical resilient fingers.

The printed inserts themselves may be selectively embossed to provide compliant features that resiliently urge the insert into alignment with the focal plane and longitudinal axes of the lenticules. Embodiments are disclosed that permit relative movement between the lenticulated screen and interlaced images to provide for animation.

In all of the embodiments disclosed, the lenticulated panels may be in the form of two-dimensional arrays of lenslets where the images are printed in corresponding two-dimensional arrays of image segments with the image segments mapped into corresponding angular perspectives.

DESCRIPTION OF THE DRAWINGS

The structure and operation of the invention, together with other objects and advantages thereof, may best be understood by reading the detailed description in connection with the drawings in which unique reference numerals been used throughout for each part and wherein:

FIG. 23 is a diagrammatic, plane view of the front cover of FIG. 22;

FIG. 24 is a diagrammatic, side elevational view of the front cover of FIG. 22;

FIG. 25 is a diagrammatic, sectional view of the front cover of FIG. 23 taken generally along line 25—25 thereof;

FIG. 26 is a diagrammatic, sectional view of the front cover of FIG. 25 taken generally along 26—26 thereof;

FIG. 27 is a diagrammatic, sectional view of the front cover of FIG. 25 taken generally along 26—26 thereof shown in combination with a fragment of a printed insert;

FIG. 28 is a diagrammatic, sectional view of the front cover of FIG. 25 taken generally along 28—28 thereof;

FIG. 29 is a diagrammatic, sectional view of the front cover of FIG. 25 taken generally along 28—28 thereof shown in combination with a fragment of a printed insert;

FIG. 30 is a diagrammatic, perspective view of a printed insert of the invention embossed with features to make it selectively compliant for purposes of aligning it with the focal plane and/or longitudinal axes of the lenticules of the invention;

FIG. 31 is a diagrammatic, cross-sectional, elevational view of a fragment of the embossed printed insert of FIG. 30 shown in combination with a fragment of a front cover of the invention to illustrate the interaction between the embossed sections of the printed insert with the tabs of the front cover;

Figure 34:
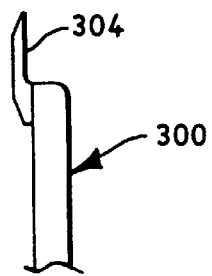
Figure 33:
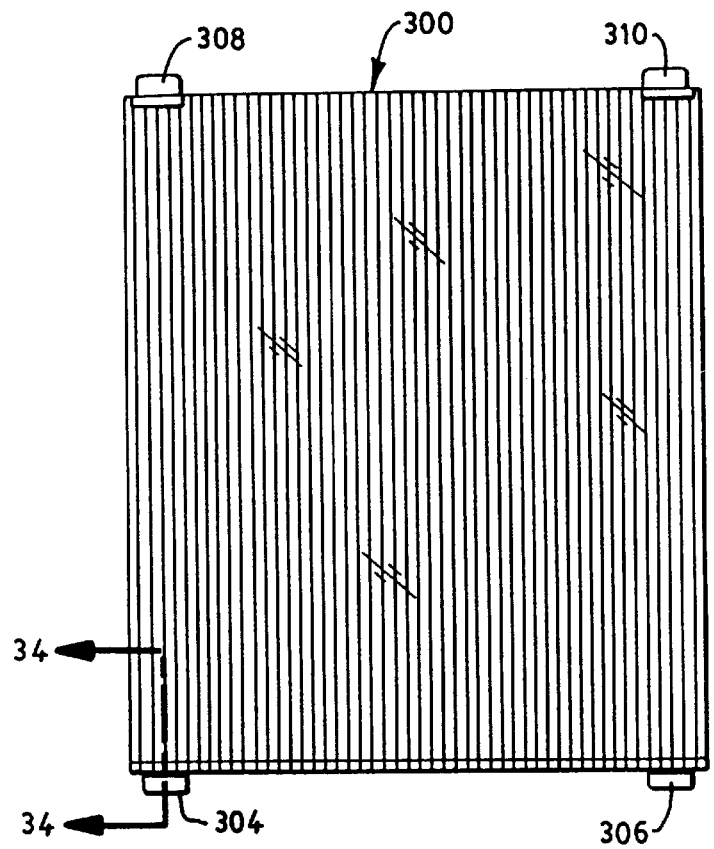
Figure 35:
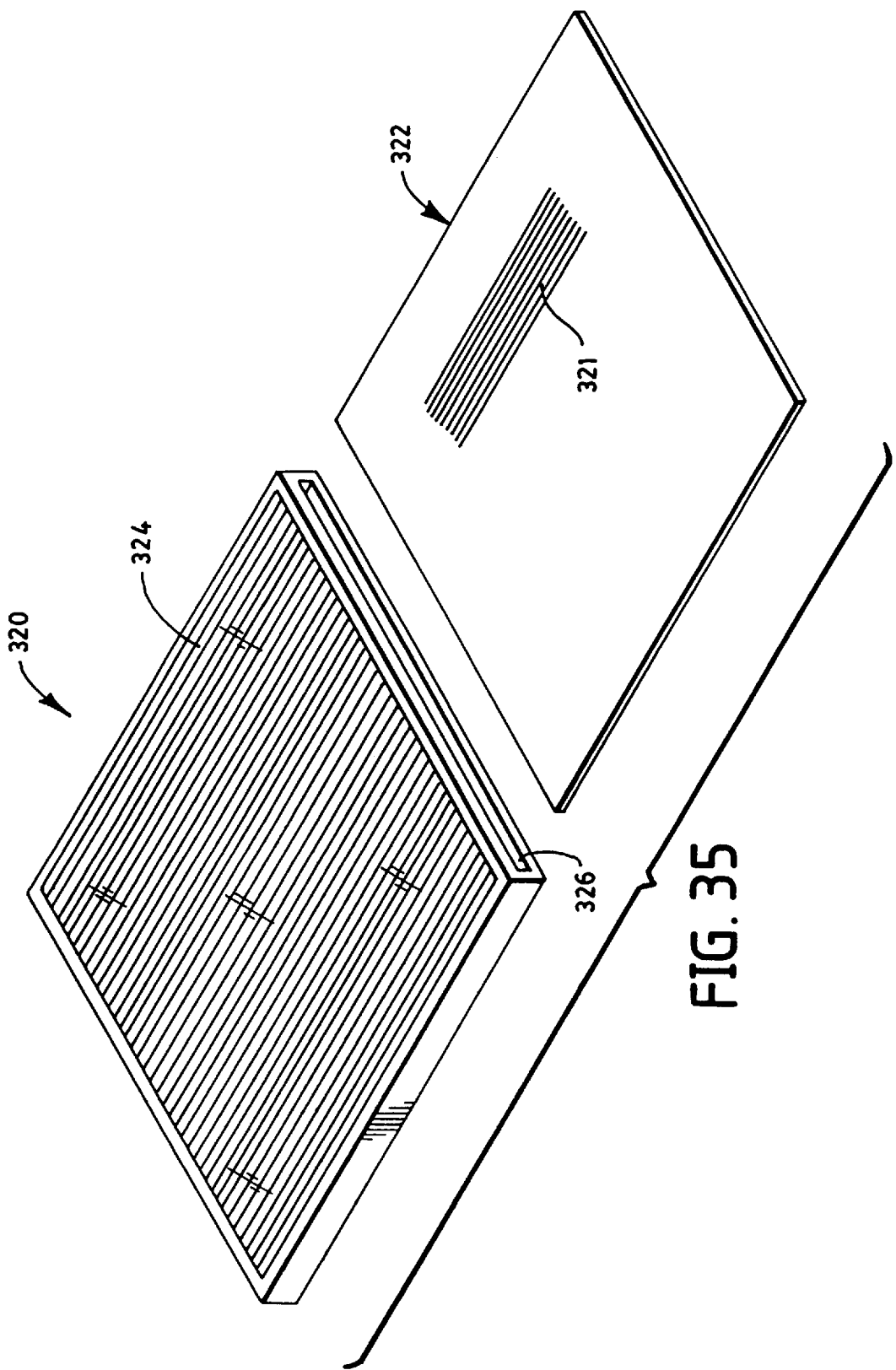

FIGS. 32 (a) through 32 (e) are a series of diagrammatic, perspective views of an alternative embodiment of the invention showing how an inventive flexible, lenticulated panel can be clipped to a surface of a container which carries interlaced images printed on it;

FIG. 33 is a diagrammatic, plan view of the flexible, lenticulated panel of FIG. 32 showing a clipping arrangement that cooperates with receiving holes in the box of FIG. 32 to align the lenticules of the panel with the interlaced images printed on the box;

FIG. 34 is a diagrammatic, sectional view of one of the clips of the panel of FIG. 33 taken generally along line 34—34 thereof;

FIG. 35 is a diagrammatic, perspective view of yet another embodiment of the invention showing a lenticulated image display frame in combination with a printed insert therefor.

Figure 36:
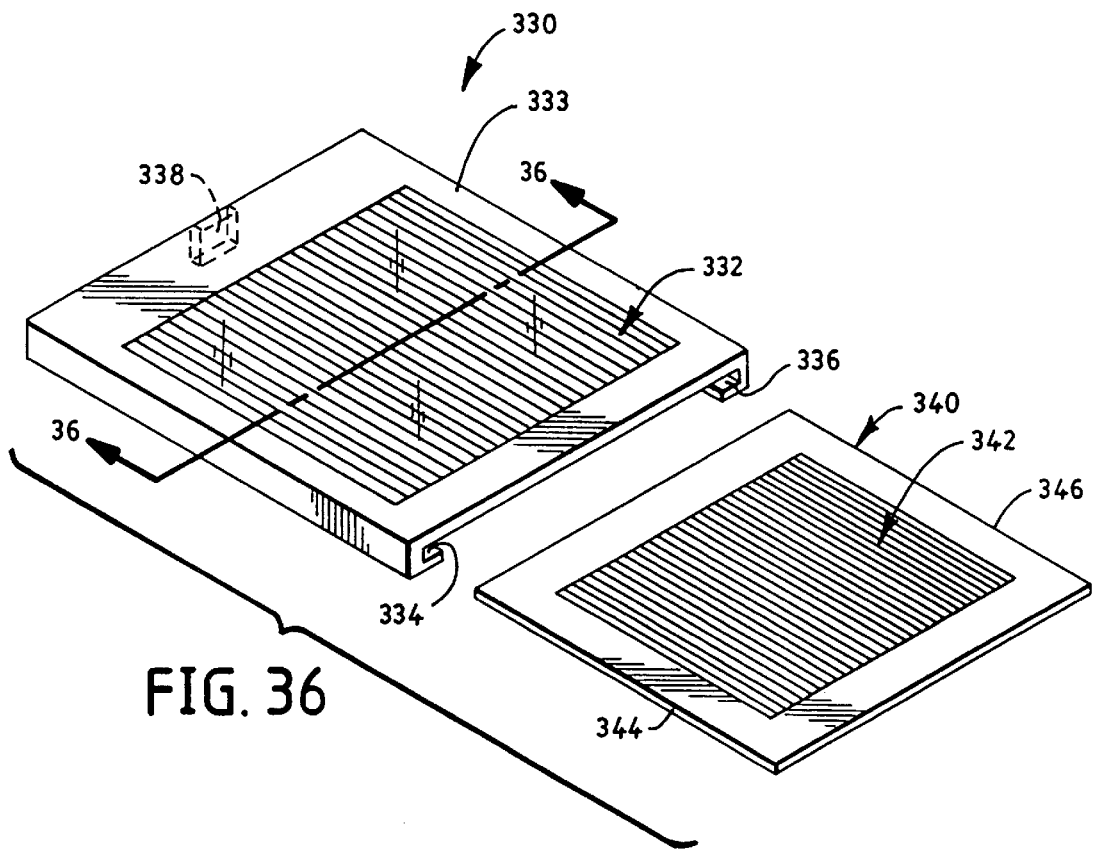
Figure 37:
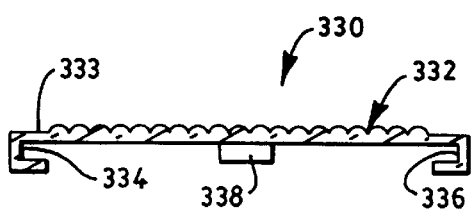
Figure 38:
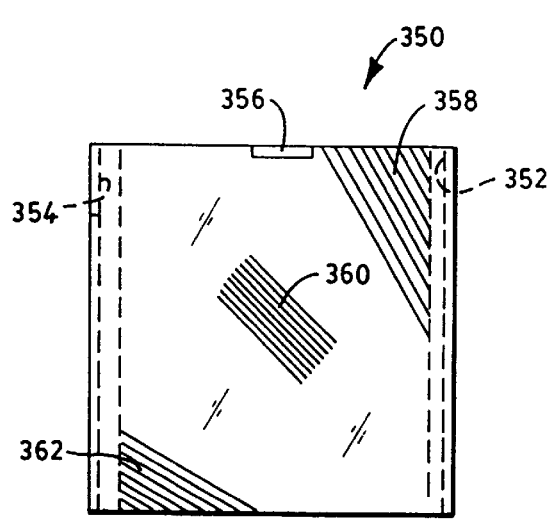
Figure 39D:
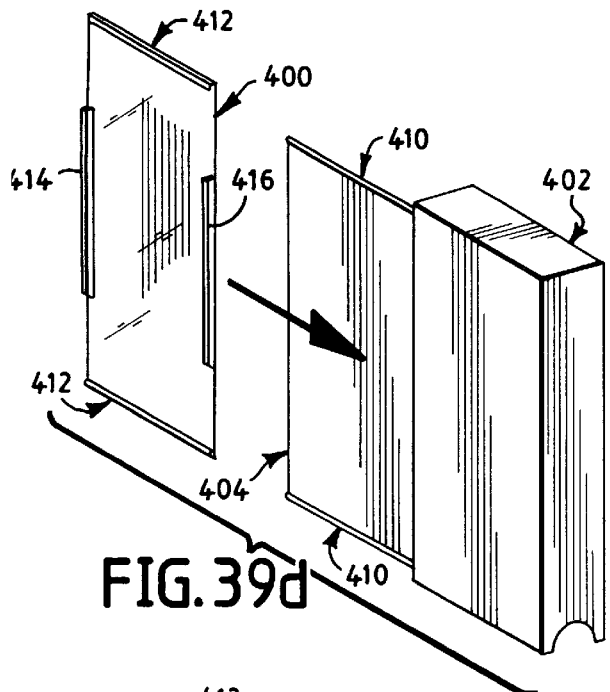
Figure 39B:
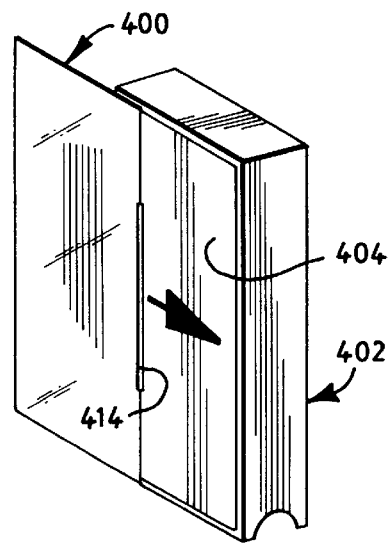
Figure 39A:
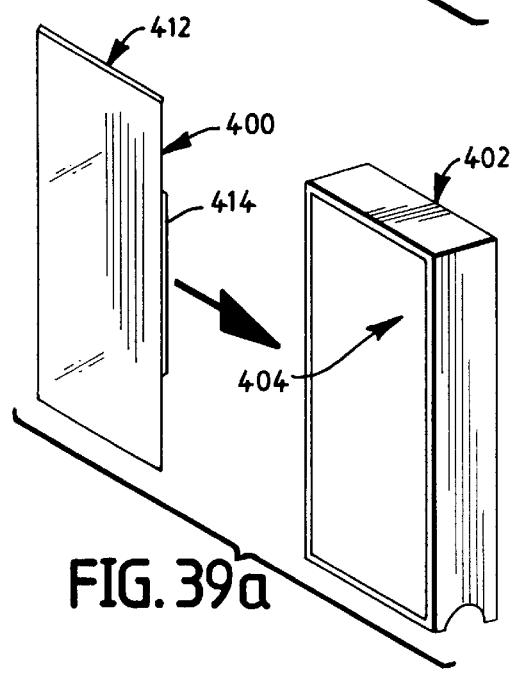
Figure 39C:
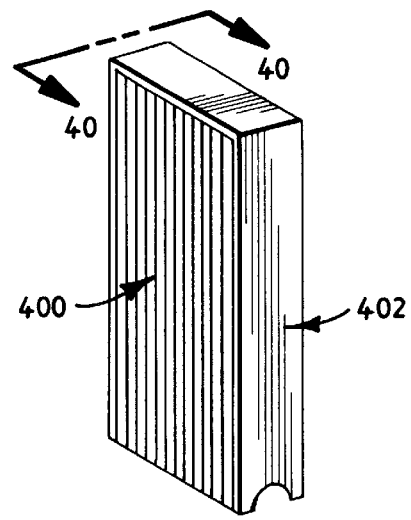
Figure 40:
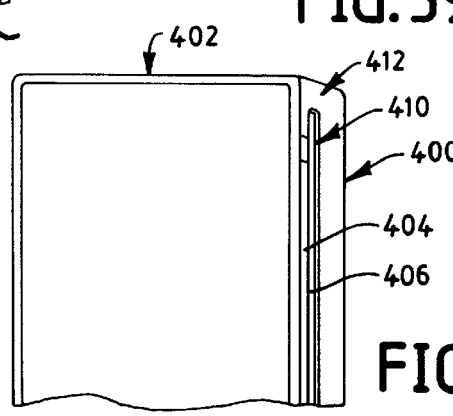
Figure 41A:
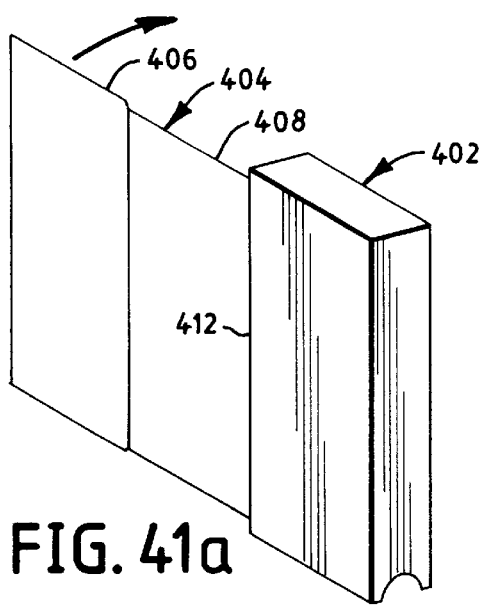
Figure 41B:
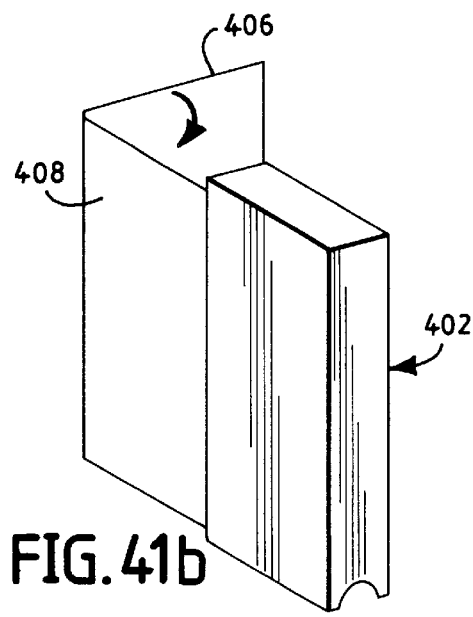
Figure 41C:
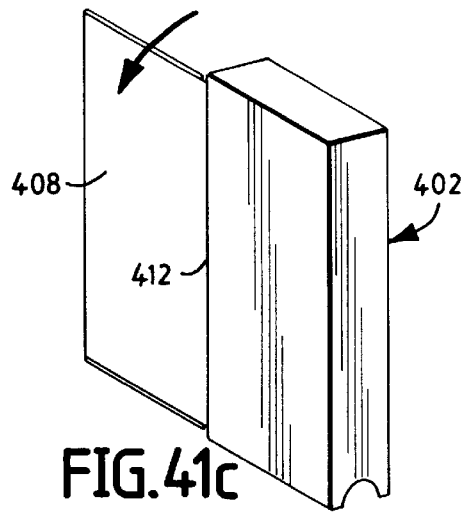
Figure 42:
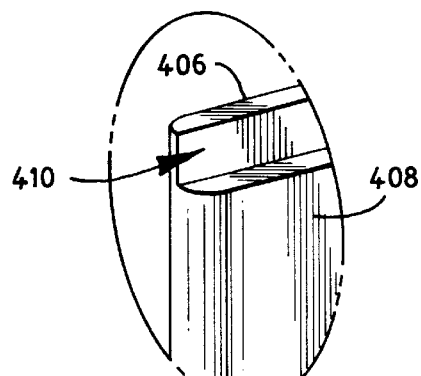
Figure 41D:
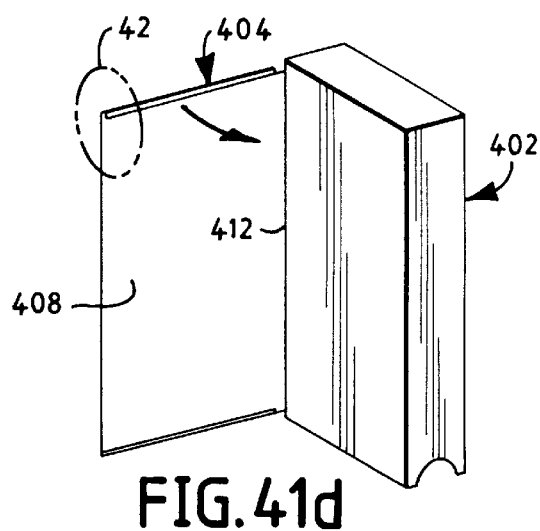
Figure 43:
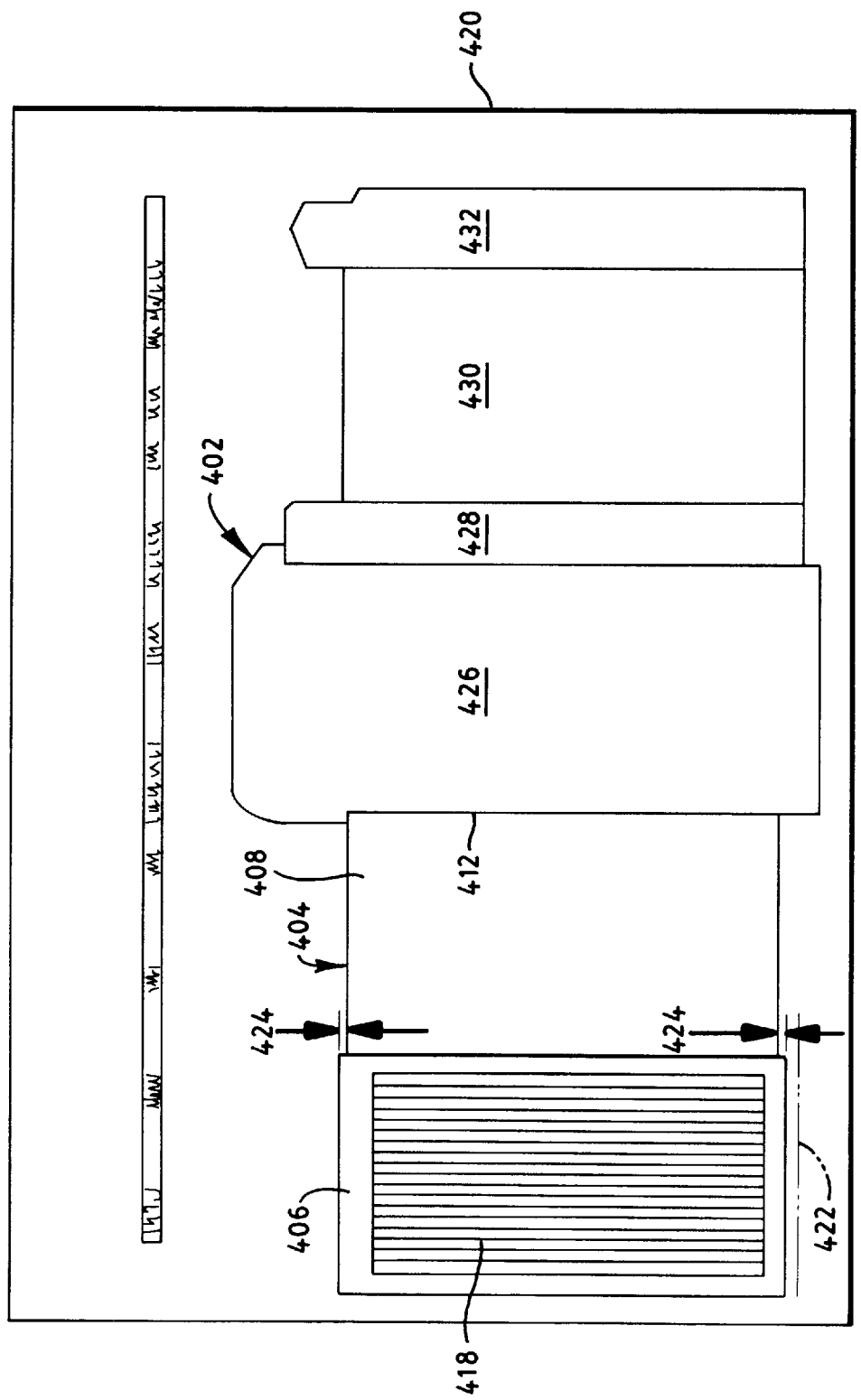
Figure 46:
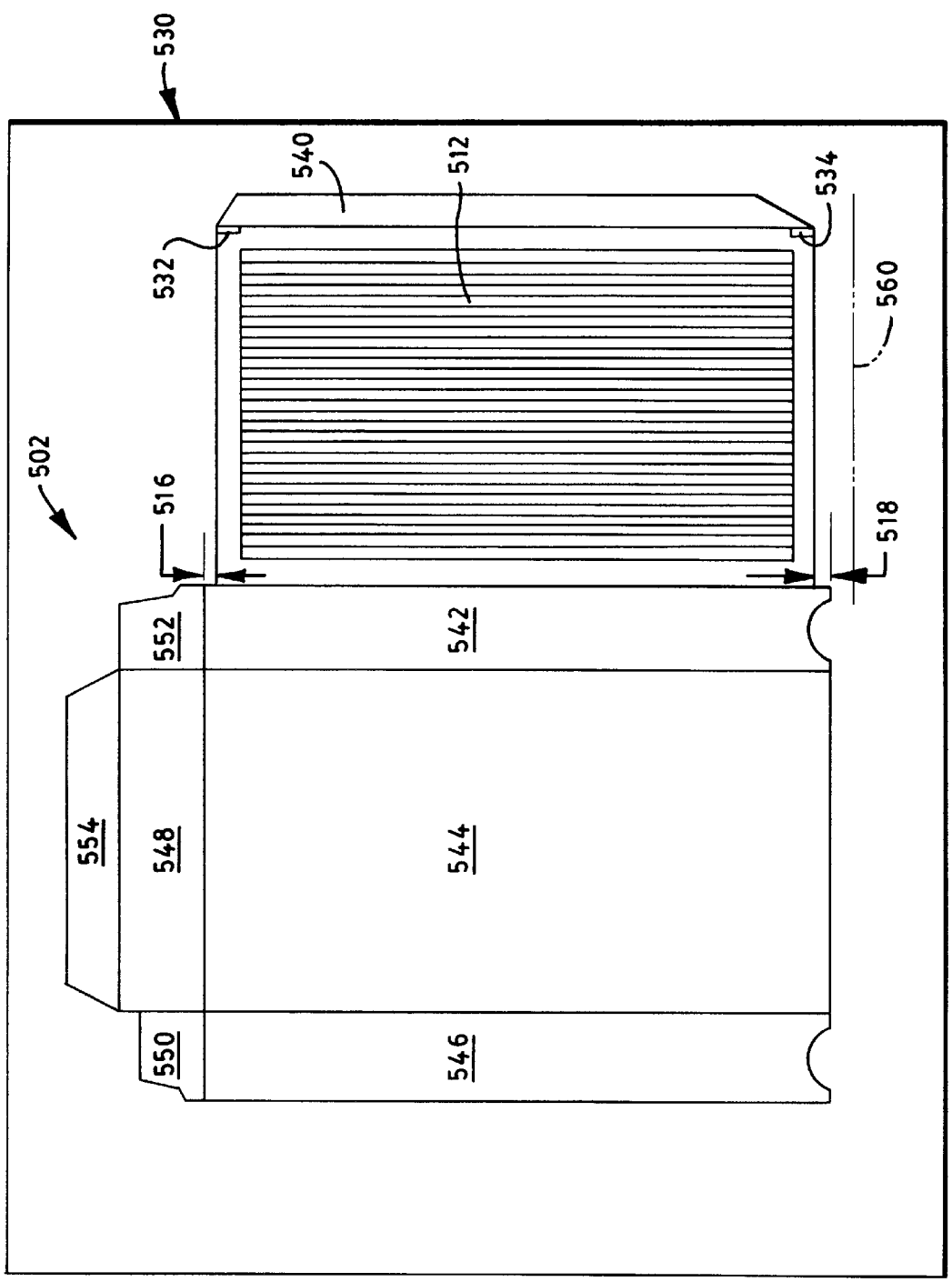

FIG. 36 is a diagrammatic, perspective view of still another embodiment of the invention showing an image display frame lenticulated on only one side in combination with a printed insert therefor;

FIG. 37 is a diagrammatic, sectioned elevational view of FIG. 35 taken generally along line 36—36 thereof;

FIG. 38 is a diagrammatic, front elevational view of yet another embodiment of the invention illustrating that reference locating surfaces of displays, boxes, and printed materials of the invention need not be parallel or perpendicular to the longitudinal axes of lenticules but only in a fixed orientation with respect to them;

FIGS. 39 (a) through 39 (d) are a series of diagrammatic, perspective views of an alternative embodiment of the invention showing how an inventive flexible, lenticulated panel can be slid, via a guide and rail arrangement, onto the surface of a container box flap which carries interlaced images printed on it;

FIG. 40 is an enlarged, diagrammatic sectional view taken along lines 40—40 in FIG. 39© showing the relationship between the guide sections of the lenticulated panel and the rail sections of the image carrying flap;

FIGS. 41 (a) through 41 (d) are diagrammatic perspectives illustrating how the image carrying flap of the embodiment of FIGS. 39 (a–d) is folded to provide for the rail sections by which the lenticulated panel is slid onto the flap in optical registration with its interlaced images;

FIG. 42 is an enlarged, diagrammatic perspective view of a detail of a rail section (circled area) of the flap of FIG. 41d;

FIG. 43 is a plan view of a printed developed rectangular sheet carrying the layout which is die cut and then folded to form the container boxes of the embodiments FIGS. 39 (a–d) and 41 (a–d);

FIGS. 44 (a–c) are a series of diagrammatic perspectives of another embodiment of a container box of the invention showing how a lenticulated panel is mated via another guide and rail arrangement with a interlaced images carried on a surface a folded box;

FIG. 45 is a diagrammatic perspective showing the positions of various cutouts in the image carrying surface of the box of FIGS. 44 (a–c) by which rail sections and relief cuts are formed to receive guides provided on the lenticulated panel;

FIG. 46 is a plan view of a printed developed rectangular sheet carrying the layout which is die cut and then folded to form the container boxes of the embodiments FIGS. 44 (a–c) and 45;

FIG. 47 is a diagrammatic, perspective view of still another embodiment of the invention showing an image display frame lenticulated on only one side in combination with a removable printed insert therefor that may be slid with respect to the lenticulated frame to provide animated views;

FIG. 48 is a diagrammatic perspective view of a two-dimensional array of lenslets that can be used as the lenticulated panel in any of the foregoing embodiments to provide two-dimensional image effects from different angular perspectives; and FIG. 49 is a diagrammatic perspective view of a lenslet of the embodiment of FIG. 48 showing that it is in the form of a truncated sphere.

BACKGROUND

Figure 1:
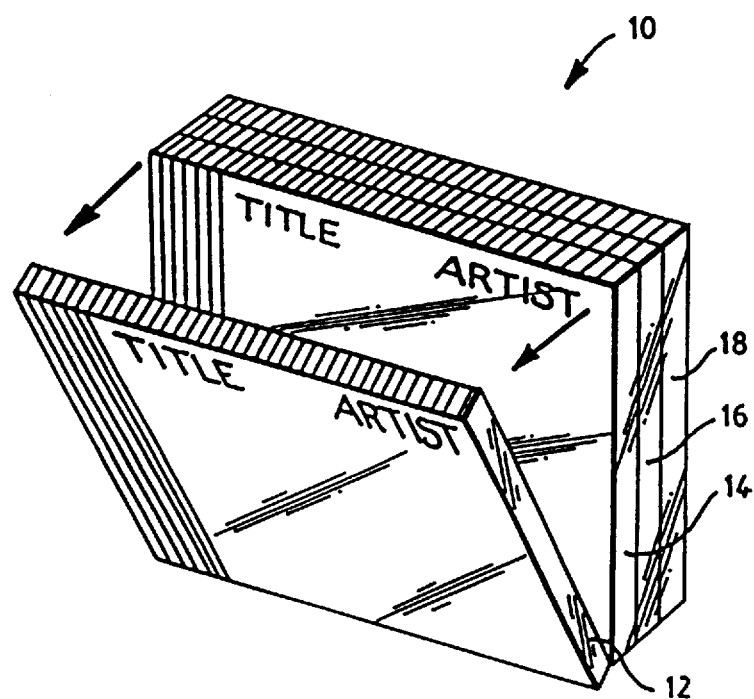
FIG. 1 is a diagrammatic perspective view of a plurality of conventional CD jewel boxes stacked to illustrate the identification problem a consumer usually encounters during the buying process.

Reference is now made to FIG. 1 which shows a stack of flat storage and display box systems for compact discs. The stack is generally designated at 10 and comprises a plurality of individual boxes 12, 14, 16, and 18, which are all identical and of conventional design for storing and displaying compact discs (CDS) such as those for recording and playing back audio information. However, it will be understood that other forms of information such as data, video, multimedia, or graphics could just as easily be recorded on such CDS and the problems associated with their marketing are similar.

Figure 2:
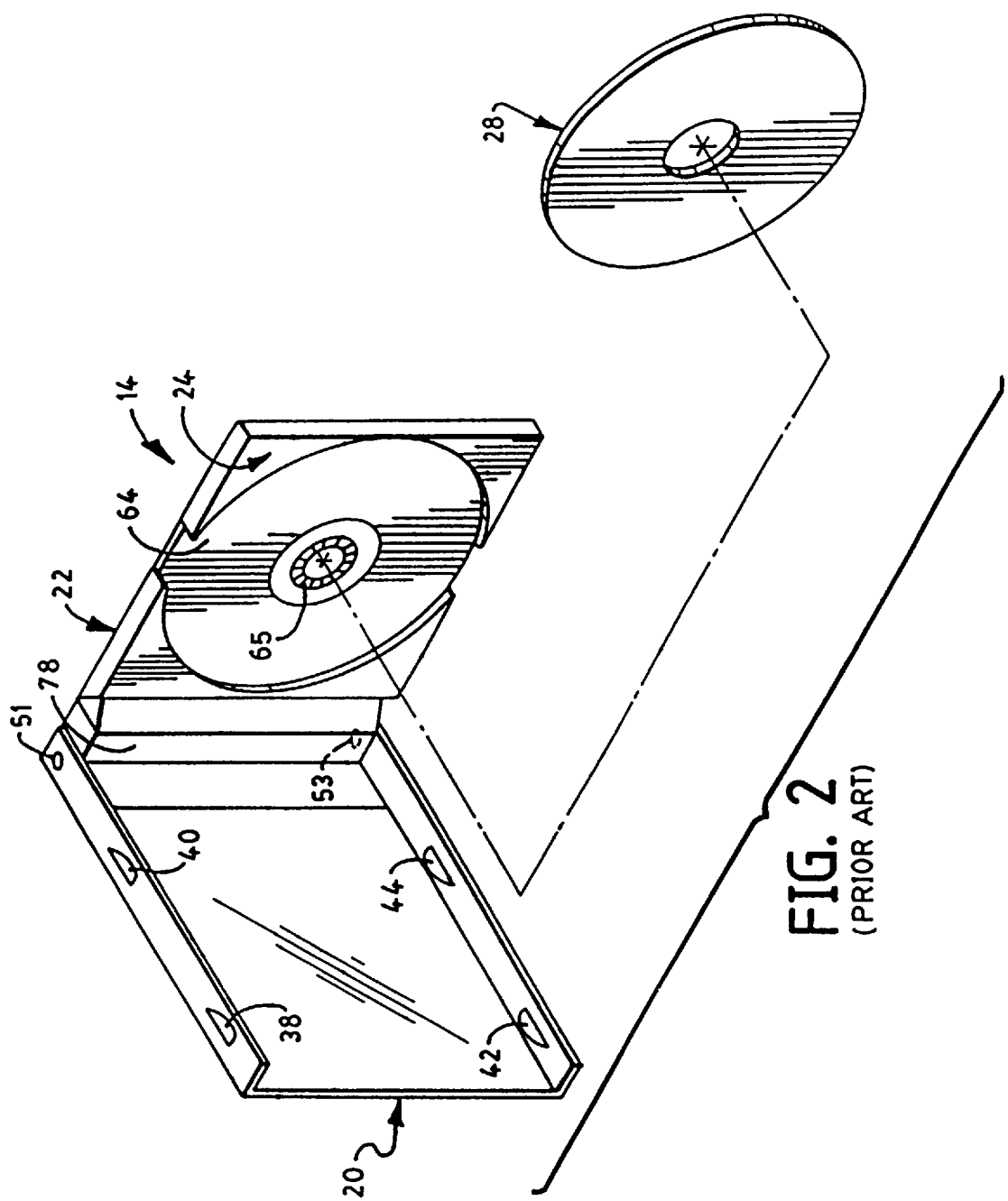
FIG. 2 is a diagrammatic perspective view of a conventional CD jewel box shown in its opened position along with a compact disc.
Figure 3:
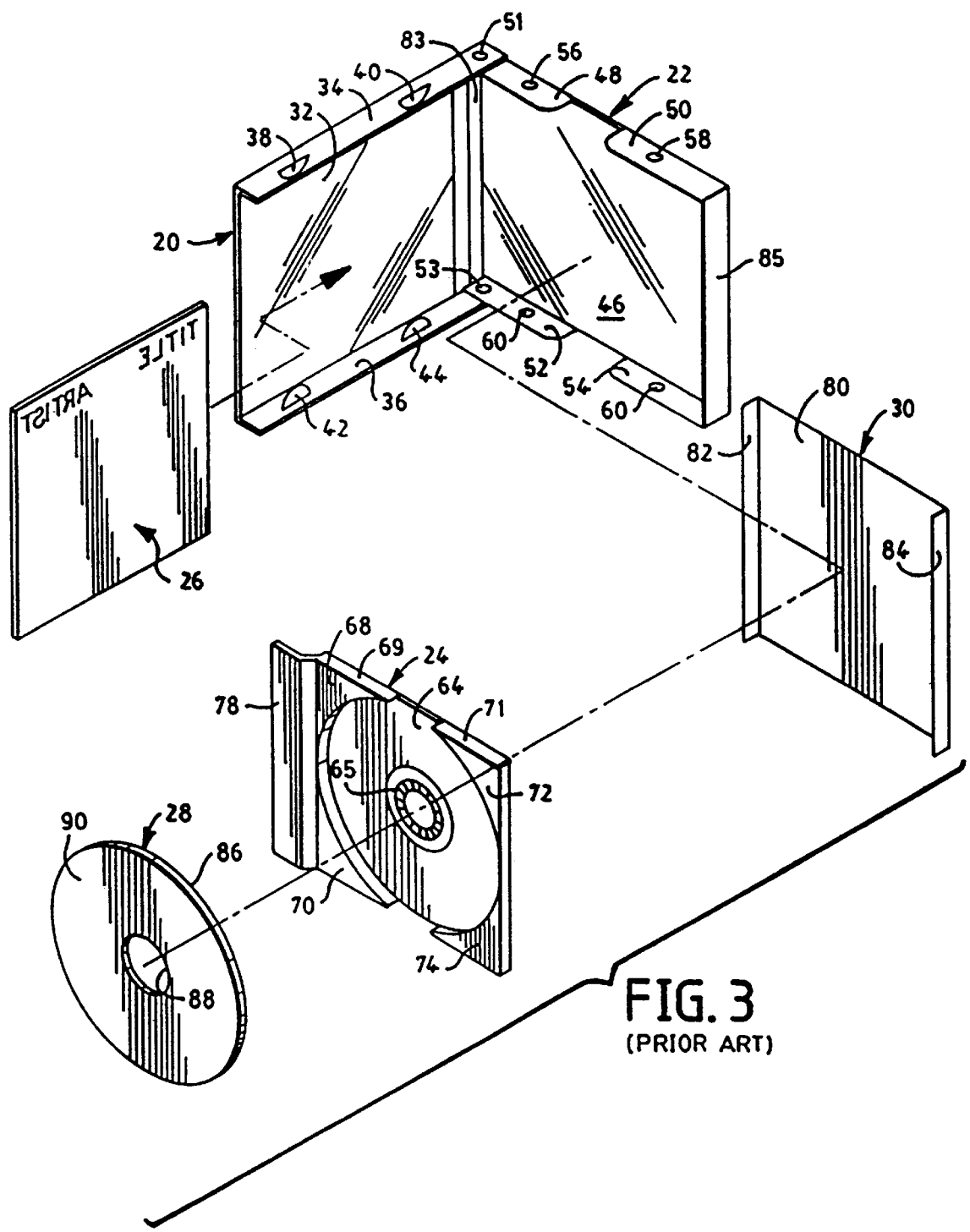
FIG. 3 is an exploded diagrammatic perspective view of a conventional CD jewel box and its various contents including a CD, program insert, and base insert with folded edges.

As best seen in FIGS. 2 and 3, each compact disc box system, considering box 14 as exemplary, comprises the following major components: a front cover 20, a rear base 22, a compact disc carrier or holder 24, an informational booklet 26, which typically carries printed graphical and textual information describing the recorded contents of the box, a compact disc 28 which bears recorded information, and a folded printed insert card 30, which typically carries a shortened textual and graphic description of the contents of the recorded information.

Front cover 20, rear base 22, and disc holder 24 are all injection molded of a suitable plastic with a wall thickness of about 1.2 mm. Overall, each box measures about 142 mm×124 mm×10.4 mm as pictured in FIG. 1 in their closed state.

Typically, front cover 20 and rear base 22 are transparent and molded of styrene or polycarbonate, while disc holder 24 may be made of either transparent or opaque plastic, colored as desired.

Referring now to FIG. 3, it can be seen that front cover 20 comprises a front flat panel 32 which has upper and lower raised edges 34 and 36, respectively. Upper raised edge 34 has a pair of spaced apart tabs, 38 and 40, extending outwardly therefrom while lower raised edge 36 is provided with a similar pair of tabs, 42, and 44. Tabs, 38 to 44, are configured and arranged to have corresponding edges of booklet 26 slide underneath them to retain it with its front surface against the rear surface of transparent front cover panel 32. In this manner, information carried on the front page of booklet 26, such as the title and artist's name for an audio disc, can be clearly seen through the front surface of front cover 20. Booklet 26 is automatically inserted into the space or "pocket" formed between the rear surface to the front cover 20 and the oppositely facing surfaces of the tabs. This is achieved through the use of high speed equipment designed especially for this purpose and widely available throughout the industry. Part of this invention, as will be seen, is to provide informational inserts, like booklets, that are adapted for use with such high speed equipment while having features particularly suitable to other purposes of the invention.

Rear base 22 also has a transparent flat panel that is designated as 46. Extending outwardly from flat panel 46 are a plurality of raised edge sections 48, 50, 52, and 54. Raised edge sections, 48 and 52, are provided with shallow circularly symmetric holes that cooperate with short complementarily configured posts on the back end of front cover upper and lower edge, 34 and 36, respectively, to provide a pair of pivots, 51 and 53, respectively. Pivots, 51 and 53, permit front cover 20 and rear base 22 to be hingedly connected to one another for movement between open and closed positions.

Folded insert 30 comprises a flat panel section 80 and two raised end edges 82 and 84, all of which can carry printed textual or graphical information. Typically, edges 82 and 84 carry just textual information.

During the assembly of a typical box storage and display system, insert 30 is usually automatically placed in rear base 22 with its information bearing section 80 against the rear surface of transparent flat panel 46 so that it can be readily perceived from the opposite surface by a CD user or customer.

In this connection, the information carried on raised edges 82 and 84 can be seen, respectively, through left and right edges, 83 and 85, respectively, of rear base 22. Left edge 83 in this instance corresponds to the hinge edge of a typical box system.

Compact disc holder 24 functions to retain insert card 30 flush with the rear surface of rear base flat panel 46 and to retain a compact disc in place. For these purposes, disc holder 24 comprises a circular tray section 64 with a flexible hub 65. Extending above circular tray section 64 are four raised edge sections, 68, 70, 72, and 74, located at the four corners of disc holder 24 and shaped to provide a rim for protecting the peripheral edges of a compact disc.

Each raised edge section, 68–72, includes raised dimples (only two shown), such as those at 69 and 71, that are adapted to be snap-fitted with corresponding tab section detent holes, 56–62, in rear base 22. In this manner disc holder 24 snaps into and is retained in rear base 22.

Compact disc 28 is seen to be a flat circular object with a front surface 86, rear surface 90, and central circular mounting hole 88. Front surface 86 carries recorded information with rear surface 90 typically carrying printed information identifying the CD recorded contents by title and artist or the like.

CD 28 is held in place by disc holder 24 with its recorded information bearing surface 86 against the front surface of circular tray 64 so that it is protected against damage. To accomplish this, a user simply aligns flexible hub 65 with circular hole 88 and then pushes against compact disc 28 until it compresses the flexible fingers of hub 65 inwardly. Further inward pressure causes the flexible fingers by design to expand after certain portions clear the thickness of a CD to trap disc 28 in place.

Disc holder 24 also includes a rectangularly shaped raised deck 78 that protrudes through front cover 20 near the hinge edge. The deck is usually provided with surface serrations extending along its longitudinal direction to provide a grip for ease of handling by the user and during manufacture.

In the assembled state as shown in FIG. 1, the information bearing surfaces in such compact disc storage and display box systems can usually only be seen by flipping through them in the manner illustrated. Because of the display arrangements adopted by retailers, it is typically only possible to flip through boxes to scan the information appearing through their front covers to identify their contents. The alternative is to pick the box up and examine all of its sides for the needed information. No information can be seen through either top or bottom edges in the position in which they are usually displayed, and the information that might be seen through the hinge or right edge of a box system is also obscured in this display position.

As will be seen in the following description, the foregoing problems with the conventional CD storage and/or display box systems or pictorial frames are solved with novel optical arrangements for providing a user or customer with more and different opportunities for more easily observing information about the contents of information carrying media such as CDS, video or audio cassettes, and for enhancing the opportunities for more creative advertising approaches to marketing such products or for displaying other pictorial or graphical information in pictorial frames and the like.

DETAILED DESCRIPTION

The present invention relates to the use of printed materials which carry interlaced images that in combination with lenticulated optics embodied in container boxes, displays, or exterior box panel attachments provide different graphical and pictorial information when the boxes or displays are viewed form different angular perspectives. Also possible are three-dimensional effects when viewed from a single perspective, special effects such as morphing, animation and two-dimensional effects from different angular perspectives.

The various embodiments of the invention share common features for accurately locating the interlaced printed images with respect to a reference edge or line on the printed materials, and with respect to lenticulated optics, when the printed materials are inserted into or on the boxes or displays. These are embodied in different preferred container box and display configurations although are not restricted solely to those disclosed. Also, it will be seen that certain features disclosed in connection with one embodiment may be used in other embodiments where desired.

The interlaced images are preferably formed by standard offset printing or desktop publishing techniques using as output devices offset printing presses or high-resolution, half-tone color printers. First, the desired content of the different views are scanned and then electronically interlaced with suitable software. Afterwards, the interlaced images are then output in electronic form in a standard format that is acceptable to the printing industry. This could be a file in TIFF or PostScript format. This file then serves as the input to standard printing technology to generate the materials which are then cut for proper fit and/or provided with alignment features which permit their accurate insertion in a box or display structure in manner to be described.

The alignment features use several approaches. Either the fit between the printed materials and the alignment features are made sensibly loose and the clearance is taken up by flexible elements that resiliently urge the printing material to the necessary alignment position and attitude within required tolerances or the fit is controlled so that any resultant clearances between the printed materials and the receiving structure doesn't permit misalignment beyond what is needed. In some embodiments, both approaches may used or elements of both may be sensibly mixed.

Several different embodiments which incorporate the invention include a CD jewel box, which could easily be used as a stand alone display, a container for general merchandise, a display for sporting figures, family members, graphics, animation, textual and/or pictorial messages, container boxes for video and audio cassettes, or the like.

Figure 4:
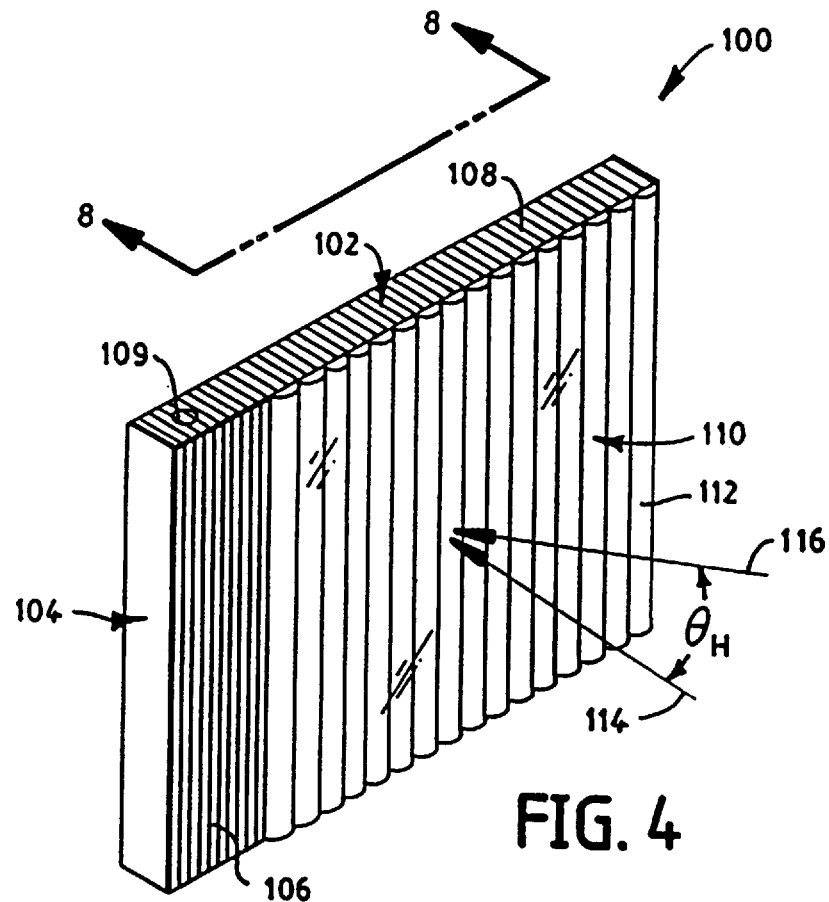
FIG. 4 is a diagrammatic perspective of an inventive compact disc box system having a vertically oriented lenticulated front panel.

Referring now to FIG. 4, there is shown an embodiment of the inventive box system designated generally at 100. Box system 100 comprises a front cover 102 hinged to a rear base 104 about a pair of pivots (one of which is shown at 109). Inside of box system 100 is a compact disk holder of novel design (See FIG. 18) and having a grooved deck 106 which is more easily gripped for ease of handling.

Front cover 102 is preferably molded of a durable plastic such as styrene or polycarbonate and includes a transparent, flat, lenticulated panel 110 in which there are formed in its front surface a plurality of vertically oriented adjacent individual lenticules 112 which make up a lenticular array or section. While lenticules 112 are shown enlarged many times, it will be appreciated that in practice they are small, having spatial frequencies ranging between, for example, 1 to 10 lenticules per millimeter.

Figure 6:
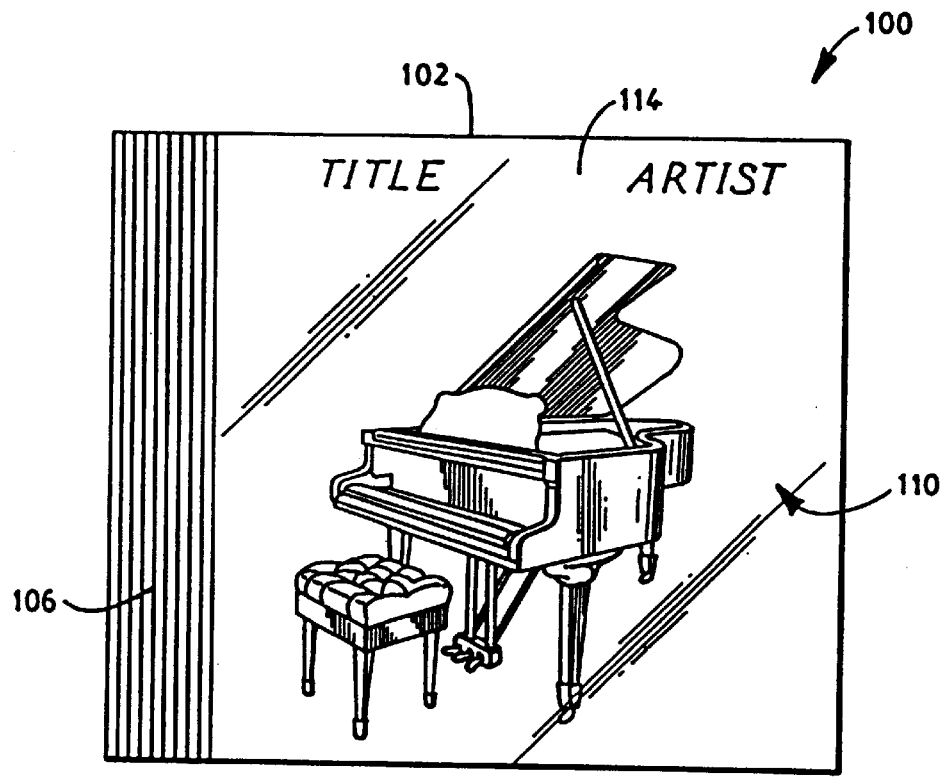
FIG. 6 is a diagrammatic vertical elevational view of the view presented to an observer looking along a first path of observation at the front of the compact disc box system of FIG. 4.
Figure 7:
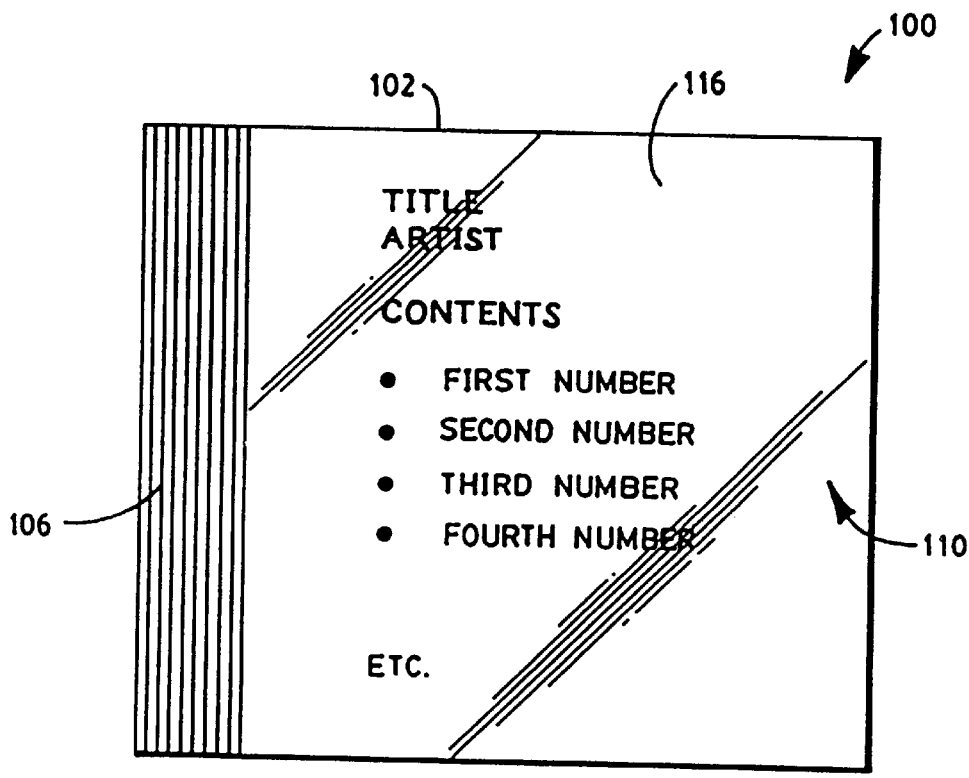
FIG. 7 is a diagrammatic vertical elevational view presented to an observer looking along a second path of observation, angularly separated from the first in the horizontal plane, when looking at the front of the compact disc box system of FIG. 4.

Information in the form of interlaced printed images resides in a plane behind the front cover lenticulated panel 110 which operates in a manner to be described to provide an observer with two different images depending on the angle at which front cover 102 is observed. Because of the vertical orientation of lenticules 112, the two available views are separated in angle in a horizontal plane perpendicular to front cover 102. In FIG. 4, the arrows designated at 114 and 116 indicate by way of example the angular separation between such views, and FIGS. 6 and 7 show examples of the different type of messages that an observer may see along such paths of observation. As shown in FIG. 6, an observer may be presented with a logo, title and/or artist information regarding the contents of a CD while viewing along the path designated as 114. Along path 116, slightly to the right of path 114, an observer can see the contents of individual numbers on the CD, as in the case of an audio CD.

While two separate views have been illustrated in connection with the description of the embodiment of FIG. 4, it will be appreciated that more than two views are quite feasible depending on the number of interlaced images provided, and such views of different information may also be presented to an observer viewing the flat wall of rear cover 104 as well. It should also be appreciated that such views can periodically repeat themselves as the angle of view over the surface of the lenticulated surface changes.

Figure 5:
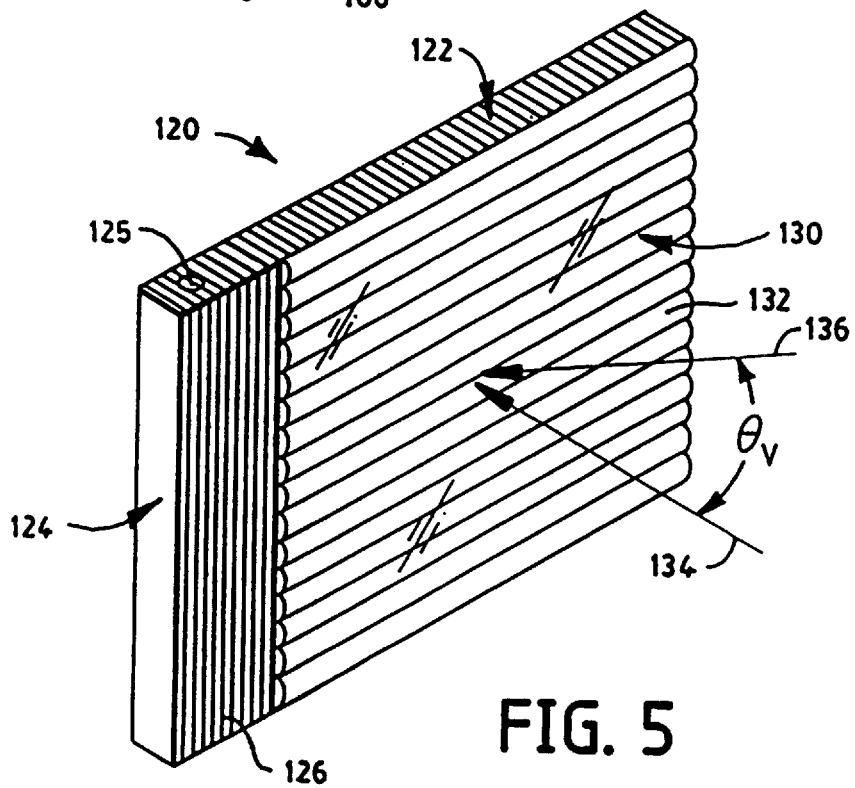
FIG. 5 is diagrammatic perspective of an inventive compact disc box system having a horizontally oriented lenticulated front panel.

In FIG. 5, an alternate embodiment of the invention is presented. Here, a box system 120 comprises a front cover 122 pivotally hinged to a rear base 124 via a pair of pivot points (one shown at 125). Box system 120 also has a novel disc holder (FIG. 18) with a grooved deck 126 that protrudes through a cutout in front cover 122. Deck 126 and a front cover side 128 have serrations or grooves as before for improving gripping and handling.

Front cover 122, as before, is injection molded of a transparent plastic in a well-known manner and includes a flat, lenticulated front panel 130 having a plurality of horizontally oriented, side-by-side, parallel lenticules 132. Lenticules 132 operate as before to provide two informational views that, in this instance, are angularly separated vertically in a plane that is perpendicular to the longitudinal axes of lenticules 132. Here, the views, which may be used to present different observable messages, are designated as 134 and 136, and their information may well be identical to that shown in FIGS. 6 and 7 or something altogether different.

As can be appreciated, each lenticule 112 operates in a well-known manner (explained in detail hereinafter) as a cylindrical lens to form line images in one azimuth corresponding to its longitudinally extending axis. More particularly, it will be recognized that each lenticule is a convex-plano thick lens obeying the well-known optical equations that apply to such lenses. For refined optical design of the lenticules beyond the application of thick lens equations, detailed ray analyses will customarily be applied in a well-known manner.

Information cards that are provided are located so that their image carrying surface is at or near contact with rear surface of the lenticulated panels 110 or 130, as the case may be. As previously mentioned, such information cards bear an interlaced image, i.e., the images of the various views to be presented to a viewer broken up into tiny adjacent image strips, alternately one image segment form one view and so on over the entire image. The interlaced images are placed behind lenticules 112 or 132 so that different combinations of them can be seen along the different perspectives; each lenticule 112 providing a view of part of the whole image which collectively are perceived as a synthesized whole by the observers visual system without notice of the lenticules themselves because of their size in relation to the visual acuity of the eye.

The insert or printed informational cards may be positioned laterally, vertically, and rotationally through the use of arrangements to be described. Suitable means such as resilient means are provided to keep the insert cards pressed against or near the focal plane of lenticules 112 or 132 to assure that the printed matter on a card is located at the proper distance from the loci of focal lines of lenticules 112 or 132 and to assure proper rotational alignment between interlaced images and lenticules.

Where it is desired to utilize existing high-speed, industry wide equipment to insert informational materials, such as printed materials, in the box system of the invention, approaches other than the use of registration pins as those of the past may be beneficially used for alignment purposes, keeping in mind that such materials must be aligned within acceptable visual tolerances with respect to the loci of focal lines of the lenticular surfaces, i.e., they must be flat over the area of visual interest, and must not be twisted, or tilted, with respect to the longitudinal axes of the lenticules. More particularly, informational inserts such as booklets must be self flattening, or otherwise rendered flat within required tolerances when in position, and preferably fit into the space provided between the current standard retention tabs and the flat surface carrying the lenticular screen so that current molds do not need to be modified especially to accommodate the inventive informational materials. The depth of space available between the retention tabs and the flat surface carrying the lenticulars is approximately 0.085 to 0.090 inches. With typical paper thickness used for booklets, for example, running at about 0.005 to 0.006 inches, it is clear that, even for booklets consisting of multiple panels, a substantial amount of available space must be filled to hold any instructional materials in place and properly aligned with the lenticules, both axially and rotationally. Moreover, since any informational insert, particularly those for use in the front cover, is suspended over a large span between oppositely facing tabs, it must be stiff perpendicular to this direction and resilient in a direction opposite so that it will flatten against the lenticulars over their whole area within the tolerances dictated by the depth of focus of the optics. For a circle of confusion of about 0.005" (visual acuity), a typical lenticular spatial frequency of 50 lenticules per inch, and a thickness of approximately 0.060, this depth of focus is about plus or minus 0.008 inches.

To solve this problem several inventive embodiments of informational inserts have been made based on the principle discussed.

Figure 8:
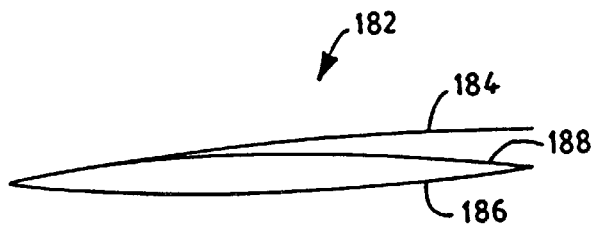
FIG. 8 is a diagrammatic side elevational view of a preferred, multi paneled, printed booklet that may be used in the practice of the invention showing that, in its free standing folded configuration, the booklet is bow shaped and compliant.
Figure 9:
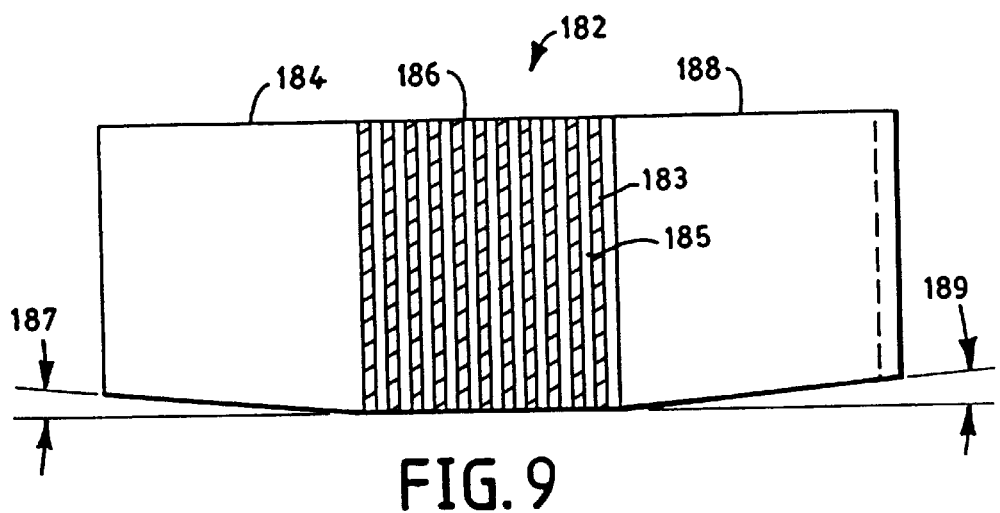
FIG. 9 is a diagrammatic, unfolded plan view of the booklet of FIG. 8.

Various approaches to making such inserts with the needed properties have been found useful. FIG. 8 shows a double folded, multiple panel, booklet 182 having three panels, 184, 186, and 188, having sharp creases between them, with the free edge of inwardly folded panel 188 entering the first crease formed between panel 184 and 186. Here, the lengths of the panels are selected so that, when folded, the edge of the last panel folded interferes with the first crease to cause the last panel to buckle under the induced compression set up in this way. This, in turn, creates the compliance needed, and the compliance may be adjusted as required by a simple length adjustment. For example, as shown in FIG. 9, the last panel to the right (188) may be made longer than the two to the left of it (184 and 186), or alternatively, in one preferred embodiment, the outer two panels may be of the same length and the middle one made shorter. Clearly, this approach makes for a reliable method of controlling resilient properties by controlling length instead of the characteristics of the creases and material properties on which information is printed.

As further seen in FIG. 9, the central panel 186 carries interlaced images indicated typically at 183 and 185. Panel 186 also is important because it is provided with an edge or reference line 181 that interacts with box structure in a manner to be described to align interlaced images 183 and 185 with the longitudinal axes of lenticules such as 112. To assure that reference edge 181 is the only one that serves this function, panels 184 and 188 are cut with a taper as indicated by the angles 187 and 189, respectively. When the panels are folded, their top edges are all kept in line so that only the reference edge 181 stands proud of the folded booklet. Again, interlaced images 183 and 185 are formed in the manner described previously, and it should be clear that they may be formed parallel to reference edge 181 as well as perpendicular to it so that either the horizontally or vertically displaced views of FIGS. 4 or 5 may be created. Moreover, it is contemplated the invention, that the reference edge and the interlaced images may be at any sensible angle. What is essential is that the reference edge and the interlaced images be in a predictable predetermined angular relationship, which could just as easily be forty-five or sixty degrees, or some other.

Figure 10:
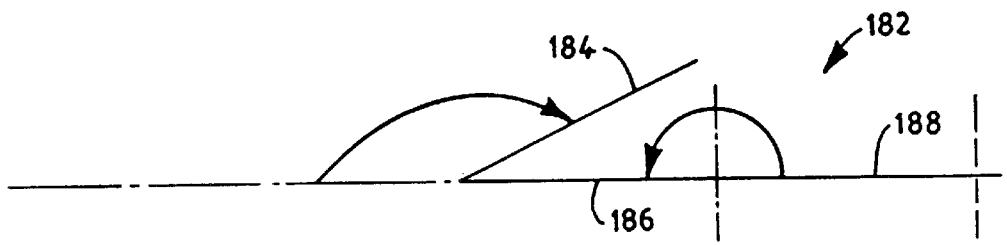
FIG. 10 is a diagrammatic illustration showing how the multi paneled booklet of FIGS. 8 and 9 is folded to achieve the configuration of FIG. 8.

FIG. 10 shows the sequence for folding booklet 182. Panel 184 is first folded on top of panel 186 with a sharp crease formed between them. Then, panel 188 is folded over panel 186, between panel 184 and 186, so that it is sandwiched between them. Again, a sharp crease is formed between these latter two.

It will be understood that tab placement can be adjusted as needed to induce the proper bending moments to cause informational inserts to flatten out against the optics. However, to change the current tab positions would be a very costly proposition which can be avoided with the present invention.

In addition to the need to have the informational inserts flat with respect to the optics, it must also be parallel to the longitudinal axes of the lenticules to within limits or adverse visual effects can occur in the form of ripples that become apparent across the face of the viewed field. What has been found preferable is to keep the interlaced images parallel to the longitudinal axes of the lenticules to within ½ or less the width of a single segment of an interlaced image resident behind a lenticule over the length of the art work of interest. Consequently, if the art work is long, this tolerance is more demanding than if short. However, what is interesting is that the art work can slide perpendicular to the lenticules without objectionable visual problems; one just sees the different views in different orders. Even so, the tilt must remain within the above limits to avoid rippling. This means that the edges of multiply folded panel inserts must be straight to within this tolerance, or at least one of them used for registration must be straight, while the others may deliberately be skewed in the opposite direction to avoid any conflict in this regard. Interestingly, while the inserts can move in parallel fashion transverse to the longitudinal axes of the lenticules without introducing visual artifacts, so long as any tilt is kept within bounds, edges skewed in the direction opposite that of the reference can provide springiness in the plane of the insert to keep it in place perpendicular to the axes of the lenticules. Otherwise, the effect of slight movement in this plane is to simply change the order in which one sees the different views.

Also, it is to be understood that the various inserts described may be rotated ninety degrees and still work even though the bowing is now also at ninety degrees to those inserts shown.

With respect to the maximum defocus and angular misalignment, the following guidelines have been found useful but can be altered depending on the image content, relationship of dominant areas, and the visual effects that one is willing to tolerate as acceptable.

The maximum defocus is some fraction of a lenticule width and is given by the ratio of the optical thickness, OT, of a lenticulated screen to the number of interlaced images multiplied by some quality factor, f, which is selected based on what is visually tolerable for a particular set of images.

The allowable angular tolerance in radians is simply the ratio of the width of a lenticule divided by its length times the product of the number of images and again some quality factor. For example, if the lenticular length is four inches, its width 0.020, there are two interlaced images and the quality factor is 2, then the allowable angular tilt is $\frac{1}{14}$th of a degree.

Figure 12:
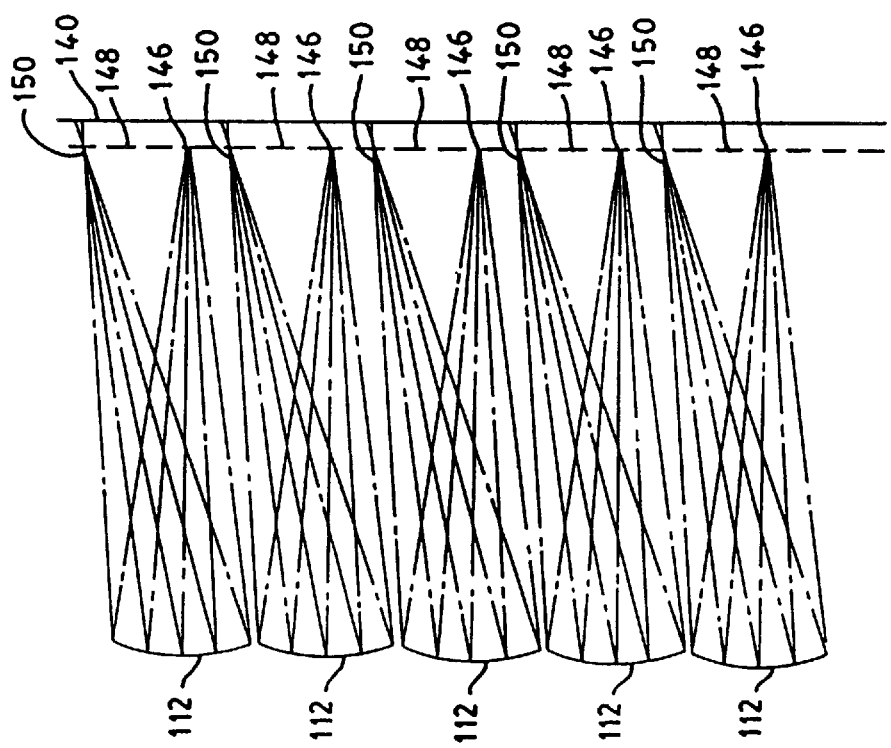
FIGS. 11 and 12 are diagrammatic drawings taken transverse the longitudinal axes of lenticulated panels used in the inventive box systems tracing the paths various light rays take in traveling to different segments of interlaced images formed on information bearing cards used in the inventive box systems.
Figure 11:
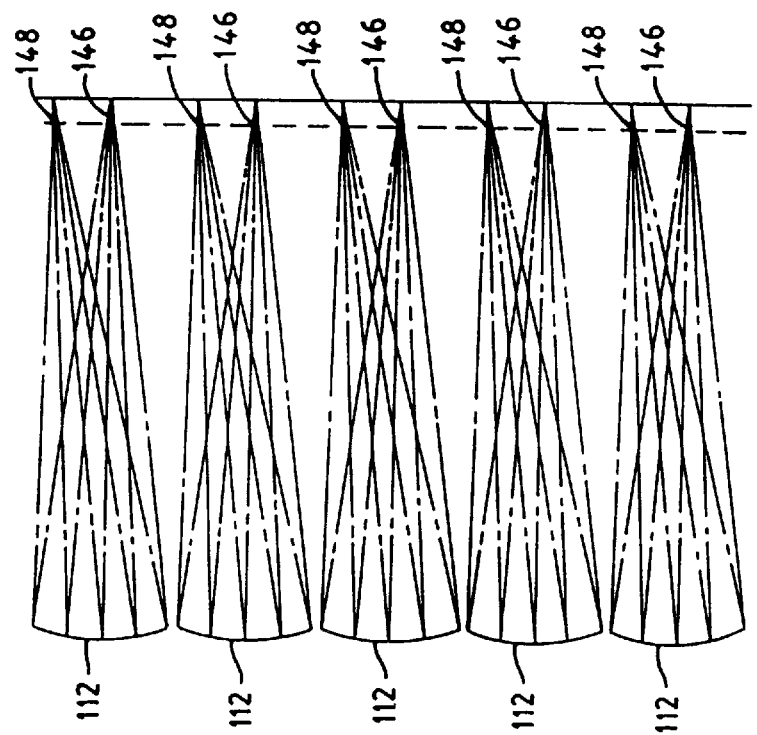

FIGS. 11 and 12 show the principle of operation of the lenticular panels used in the box systems of the invention. Both figures are traces illustrating the paths that certain light rays take in traveling from different portions of the interlaced images used in the invention to provide the different views for a particular lenticule design. Here, the ray traces were done for lenticules 112 that are made of styrene with an index of refraction of 1.59, have a radius of 0.0285 inches, and an apical focal distance of 0.058 inches, i.e., the distance from the front surface on the axis to the optimal focus of a lenticule, here the dashed line which represents the interlaced image. The printed informational card actually resides behind this location by a distance of 0.003 inches so that there is an air gap of this amount between the front surface of a card (140) and the dashed line.

In FIG. 11, an observer looking straight along the axis of lenticules 112 sees a different segment of the whole image behind each lenticule 112 where each segment is designated at 146. If the observer looks along a line of sight that is at 10 degrees with respect to the axis, image segments designated at 148, which correspond to a different image, can be seen while those designated at 146 cannot.

In FIG. 12, image segments 150 are seen at an angle of observation inclined to the axis at 20 degrees so this may represent yet another message or a repeat of a previous message slightly shifted.

Figure 13:
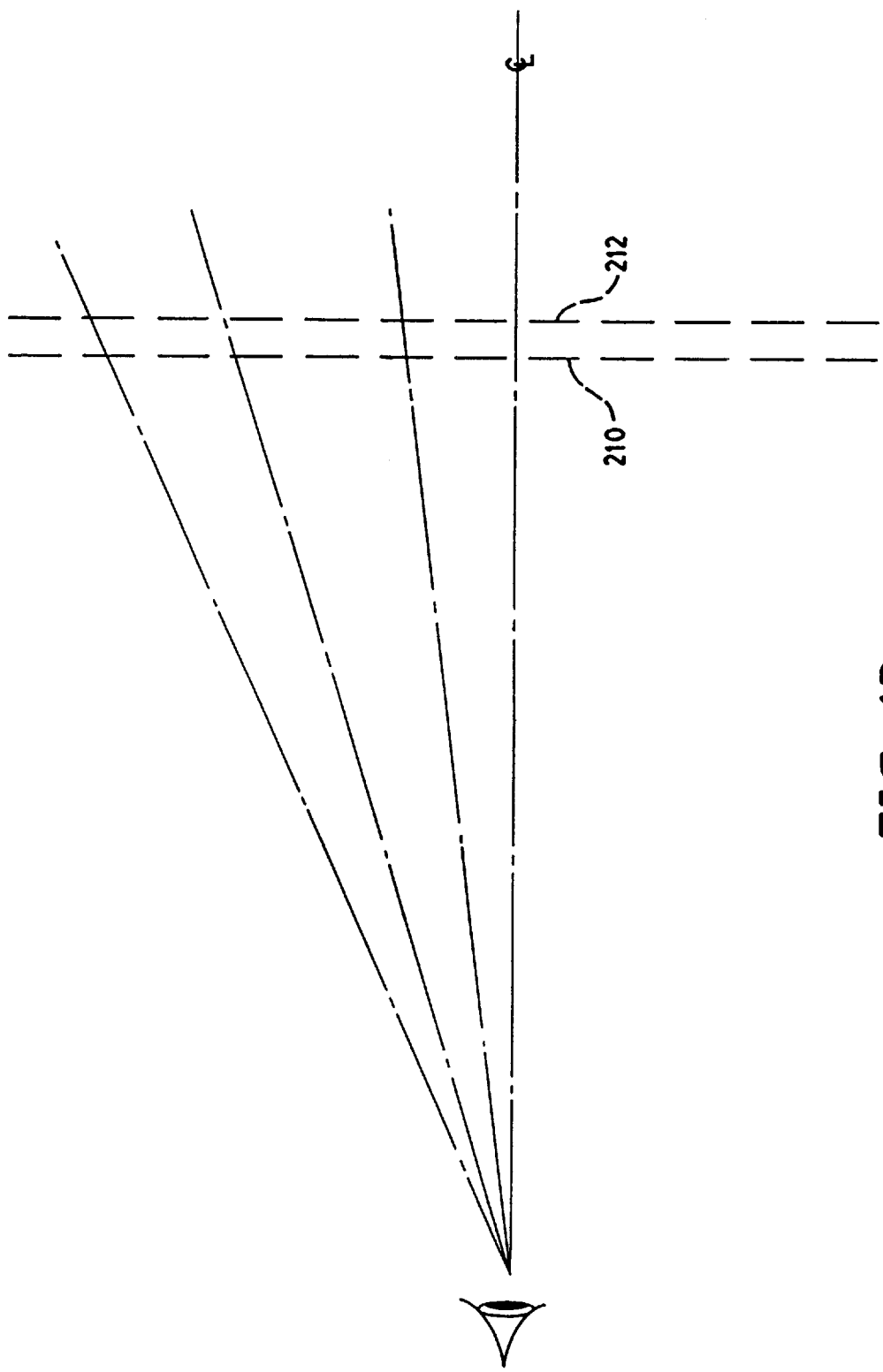
FIG. 13 is a diagrammatic view illustrating the nature of parallax effects that are corrected by certain features of the invention.

Reference is now made to FIG. 13, which illustrates, the parallax effect that can occur in using the invention if the size of the actively imaging lenticulated surface becomes large in relation to the interpupillary distance of the eye or the viewing distance is correspondingly small in relation to the overall image size. The parallax effect comes about because of a displacement of the chief ray passing through the center of each lenticule with respect to its corresponding image segment as the angle of observation of a lenticule increases compared with the normal to that lenticule. The result is that every chief ray, if not corrected for this effect, does not pass through its correct interlaced image segment. The visual result is a softness or blurriness in changing from one view to the next or poor separation between views. The phenomenon is shown heuristically in FIG. 13. Let 210 represent the lenticules with a given spacing (assume thin lens theory applies) and 212 represent the interlaced images at the same spatial frequency of the lenticules. Here, the dashes for the interlaced images in 212 can comprise just one image or several images in the allocated space. For purposes of the illustration, they can be assumed to represent one image segment, but the argument applies if they represent more than one.

As can be appreciated, the lenticules and images line up perfectly just like one picket fence behind another, and when one looks through a lenticule normal to it (the lenticules are transparent), one sees a corresponding image segment right behind it. However, when viewing 212 at some angle other than normal incidence, it is clear that one no longer sees the proper corresponding image segment. Instead, the line of sight begins to walk away from the proper image segment as the viewing angle increases until the proper image is missed altogether. This results in a partial view of both images simultaneously, a generally undesirable result.

Figure 14:
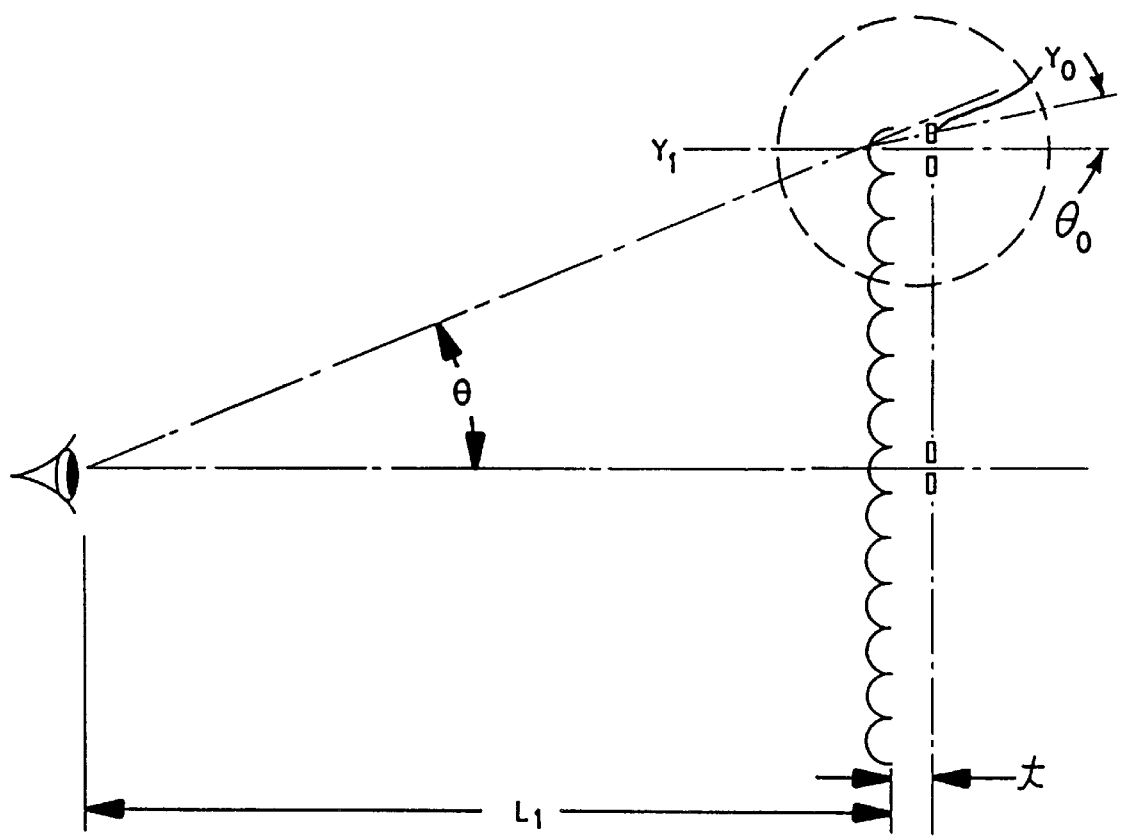
FIG. 14 is a diagrammatic illustration showing in more detail how the parallax effects of FIG. 13 occur as a result of differences in the angle of perspective from which an observer "sees" different segments of interlaced images of the invention.
Figure 15:
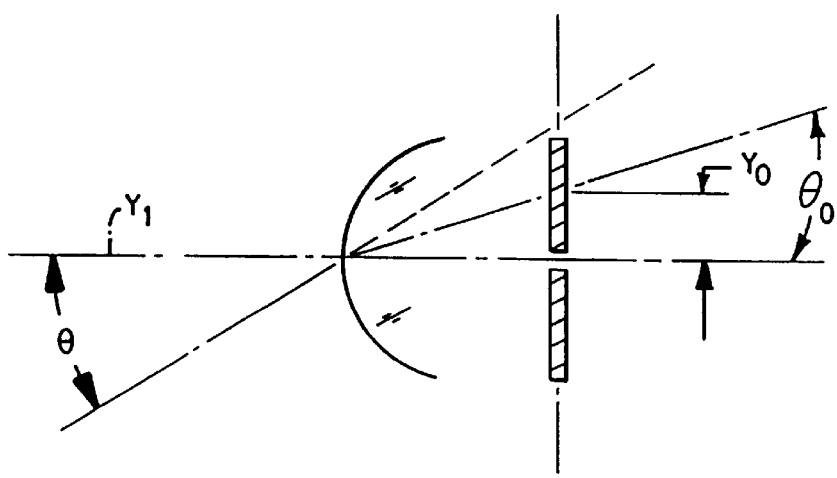
FIG. 15 is a diagrammatic illustration showing the origins of a visual parallax effect that exists without the corrective features of the invention.

FIGS. 14 and 15 show in more quantitative terms exactly by what amounts the chief ray "walk-off" problem amounts to. More particularly, let $y_o$ be the ray height of the chief ray for any lenticule as a function of the angle of observation, $\theta$, and vertical position of the y-intercept of an incoming ray. Then $\theta_o=\theta/n$, where n is the index of refraction of the lenticular material and $L_1$, is the viewing distance. Then, $$y_o=y_1(1+(t/n)/L_1)$$

If one lets, $f_o$=the spatial frequency of the interlaced images, then to compensate for the progressively larger errors in $y_o$ with increasing viewing angle, then, $f_1$, the spatial frequency of the lenticules is given by:

$$f_1=f_o(1+(t/n)/L_1)$$

Thus, the parallax effect may be compensated for exactly for any assumed viewing distances or optimized over a range of viewing distances.

While the preferred way of correcting for parallax effects is to increase the spatial frequency of the lenticules to progressively drop the center of each lenticule downwardly with increasing angle, it is to be understood that the spatial frequency of the artwork may also be adjusted or both can be altered to address the parallax problem. However, it is somewhat easier to build the correction into the molding tool and use available printing techniques to achieve the spatial frequency of the interlaced images.

Figure 16:
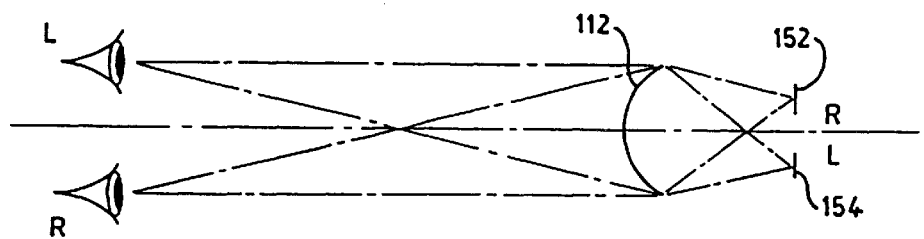
FIG. 16 is a diagrammatic plan view illustrating the principle of operation of the lenticulated surfaces of the invention.

FIG. 16 diagrammatically shows how the interlaced images and lenticules may be used to provide stereo image sets, such as stereo pairs, so the view of the box system front cover or other display may be a stereo image. Here, the system is arranged so that the left eye sees a left stereo image segment behind the right side of a lenticule 112 while the right eye sees a right stereo image segment behind the left side of a lenticule 112. The overall effect is for the right and left eyes to have presented to them full left and right stereo image pairs. Here, again, parallax effects can be corrected in the manner previously described.

It will also be recognized that multiple 3D images are contemplated through the use of multiple interlaced stereo images.

Figure 17:
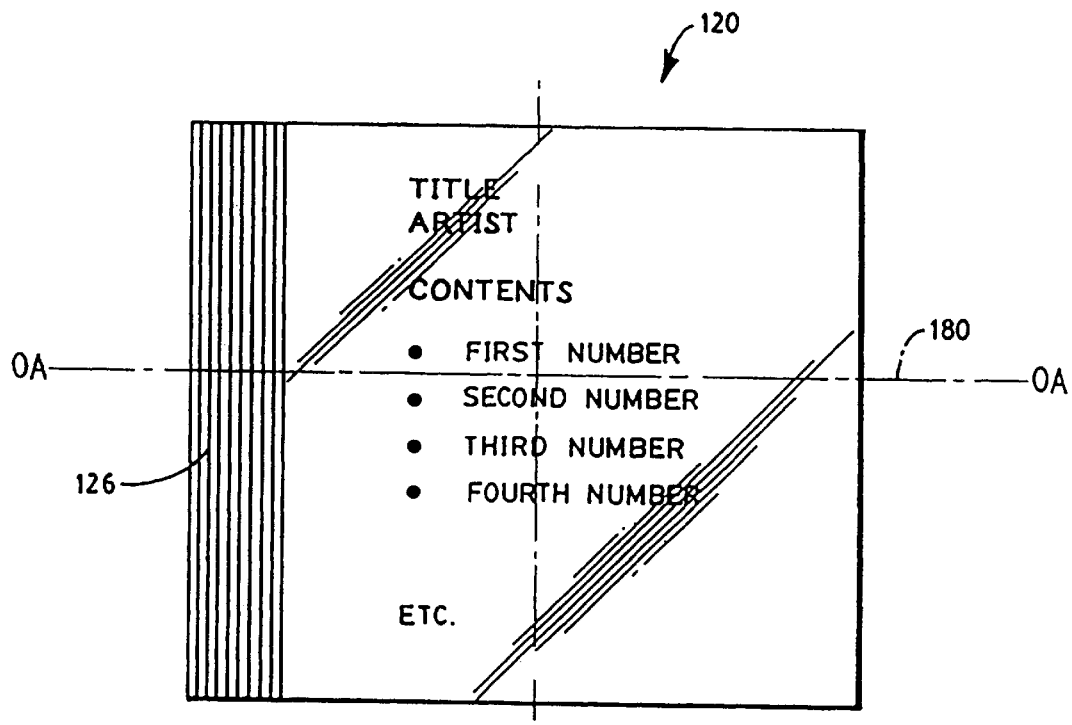
FIG. 17 is a diagrammatic front elevational view of the box system of FIGS. 4 and 5 shown with additional elements to illustrate the importance of alignment of informational material with the longitudinal axes of the lenticulated surfaces of the invention.

FIG. 17 further illustrates the importance of proper alignment of the informational content of the card with the longitudinal axes of the lenticules used in the invention. If the longitudinal axis is taken to correspond to the horizontal axis, OA, of a lenticule, then reference edge 181 (FIG. 9) is preferably positioned parallel to it to achieve proper alignment within the tolerances provided in the previous discussions regarding tolerance guidelines. This would be true if the optical axis of a lenticule ran vertically rather than horizontally as shown. Again, angular orientations other than parallal or perpendicular are beneficial and are within the scope of the invention.

Referring now to FIGS. 18–21, there is shown a novel compact disc holder 200 for use in properly locating printed inserts with respect to the lenticular focal plane of the boxes of FIGS. 4 and 5. As will be seen, disc holder 200 is provided with a plurality of flexible arms that act as lifters resiliently urge a printed insert into the desired alignment with the focal plane while still being suitable for use with conventional high-speed assembly equipment.

As will be seen from the figures, compact disc holder 200 functions to retain an insert card flush with the rear surface of rear base flat panel 110 or 132 and to retain a compact disc in place. For these purposes, disc holder 200 comprises a circular tray section 202 with a flexible hub 204. Extending above circular tray section 202 are four raised edge sections, 206, 208, 210, and 212, located at the four corners of disc holder 200 and shaped to provide a rim for protecting the peripheral edges of a compact disc.

Each raised edge section, 206–212, includes raised dimples (only two shown), such as those at 214 and 216, that are adapted to be snap-fitted with corresponding tab section detent holes, 56–62, such as those shown in the conventional rear base 22. In this manner disc holder 200 snaps into and is retained in a rear base of conventional design.

A CD is held in place by disc holder 200 with its recorded information bearing surface against the front surface of circular tray 202 so that it is protected against damage. To accomplish this, a user simply aligns flexible hub 204 with circular hole 88 and then pushes against compact disc 28 until it compresses the flexible fingers of hub 204 inwardly. Further inward pressure causes the flexible fingers by design to expand after certain portions clear the thickness of a CD to trap disc 28 in place.

Disc holder 200 also includes a rectangularly shaped raised deck 218 that protrudes through front cover 102 or 122 near the hinge edge. The deck is usually provided with surface serrations extending along its longitudinal direction to provide a grip for ease of handling by the user and during manufacture.

Figure 18:
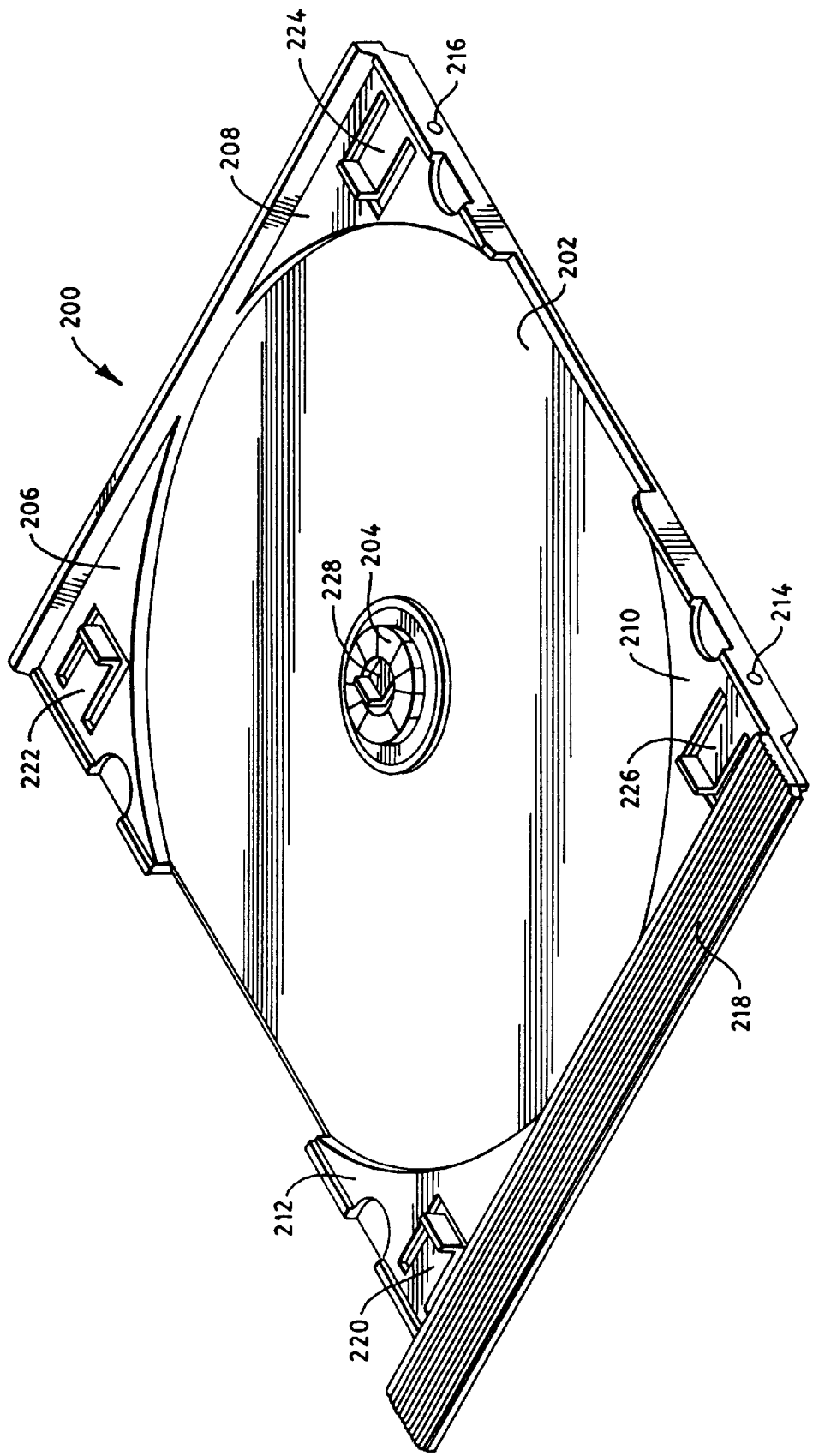
FIG. 18 is a diagrammatic, perspective view of a disc holder provided with resilient fingers to urge a printed insert, such as a booklet, into registration with the focal plane of a lenticulated panel of the invention.

As best seen in FIG. 18, each of the raised edge sections (206–212) is provided with a flexible arm designated at 222–226, respectively. Each flexible arm (222–226) resides in a corresponding rectangular shaped hole in a corresponding raised edge section and comprises as horizontal section 230 and a vertically extending tab section 232 as shown typically in FIG. 21. The flexible arms are each preferably structured so that, when such holders are stacked on top of one another, the flexible arms are pushed beneath the surfaces of their corresponding raised edge section but not beyond the bottom surface of the disc holder 200. This enables the use of standard assembly equipment for high-speed operation.

At the center of flexible hub 204 there is provided yet another flexible arm 228 of similar construction. Arm 228 similarly retracts flush for ease of use with assembly equipment and is optional depending on the properties of the printed inserts with which it is used. Obviously, stiff, thick inserts would be less apt to require its use than thin, flexible inserts. In any event, arm 228 is preferably formed as an integral part of one or more of the rosettes of central flexible hub 204.

Figure 21:
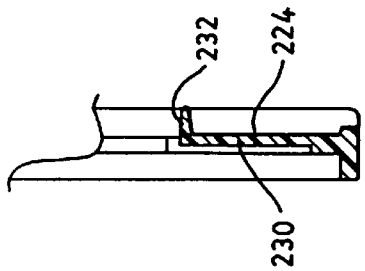
FIG. 21 is a diagrammatic, sectional elevation of a portion of the disc holder of FIG. 19 taken generally along lines 21—21 thereof.
Figure 19:
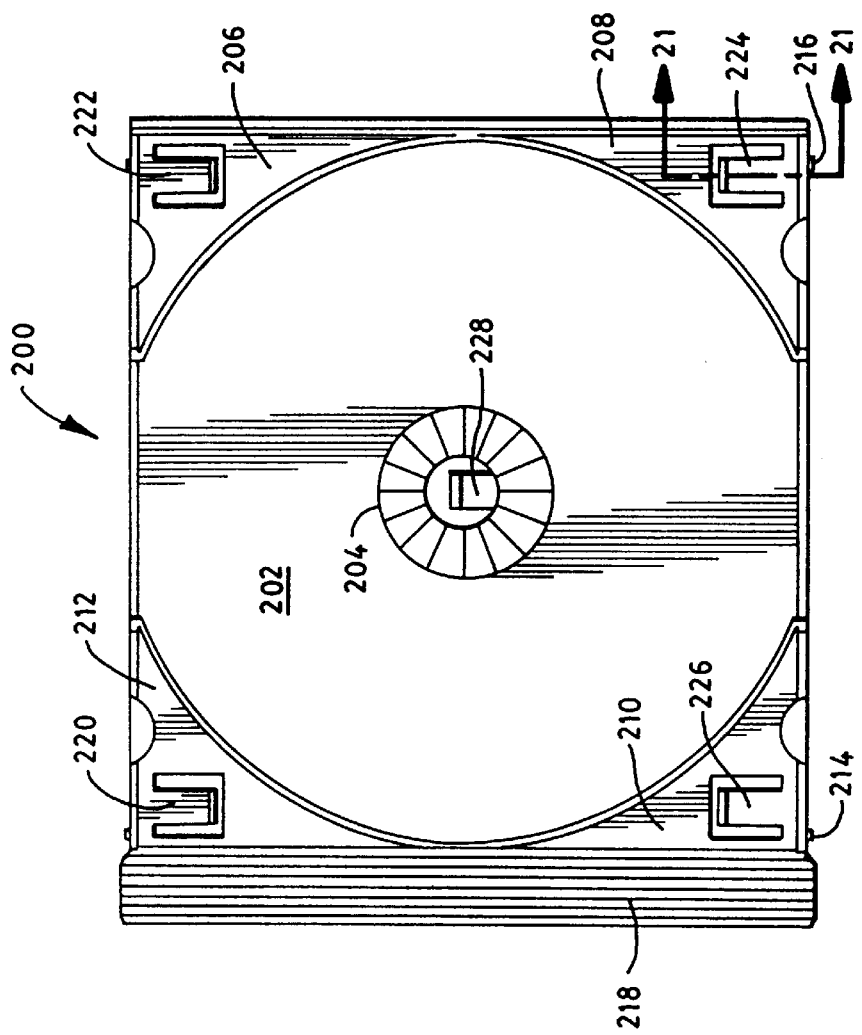
FIG. 19 is a diagrammatic plane view of the disc holder of FIG. 18.
Figure 20:
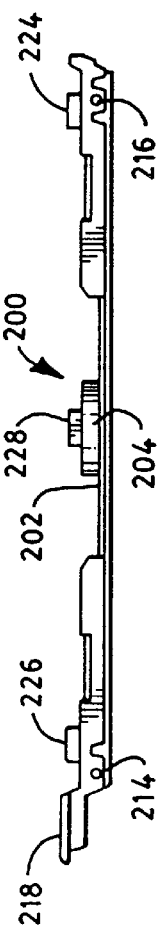
FIG. 20 is a diagrammatic elevational view of the disc holder of FIG. 18.
Figure 22:
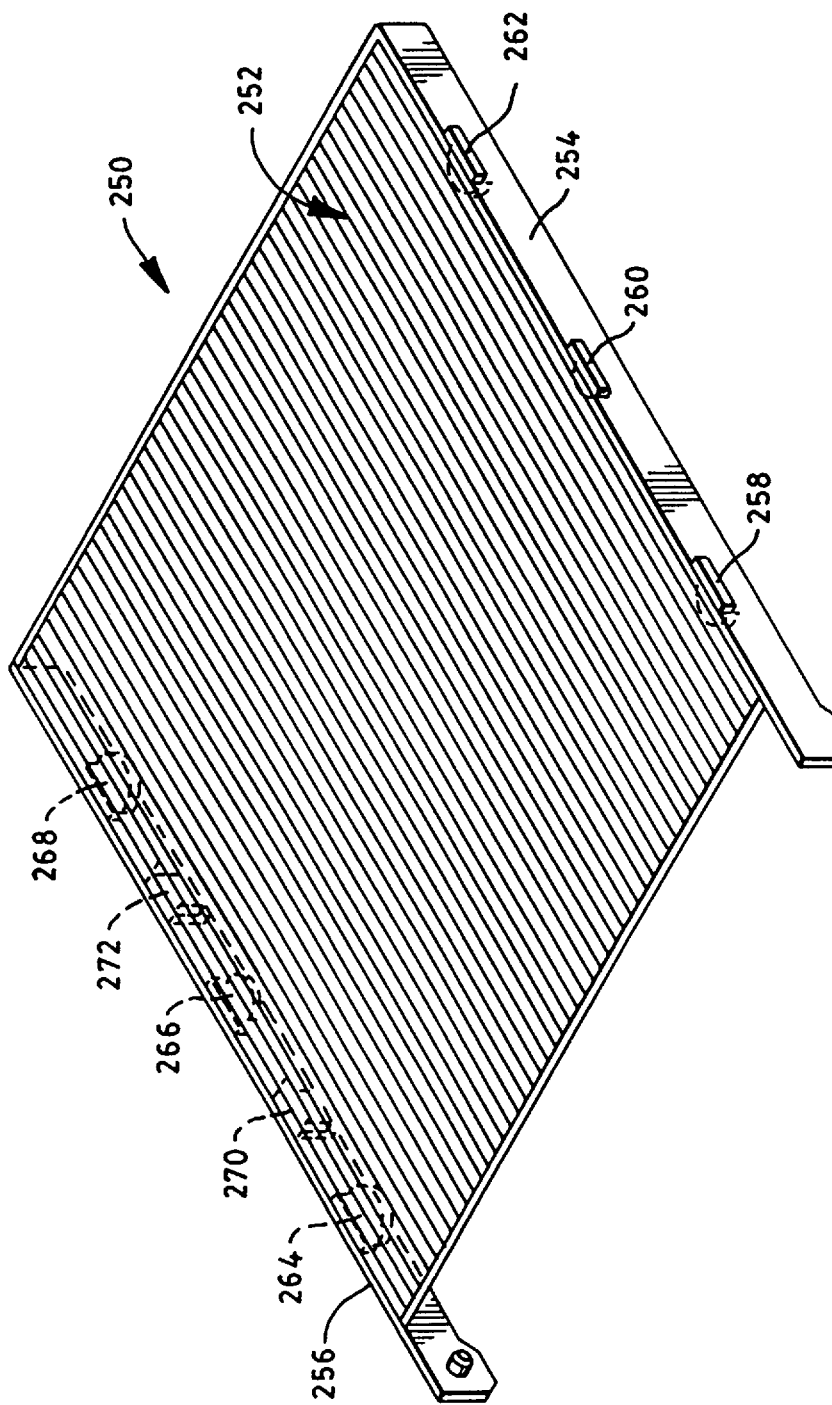
FIG. 22 is a diagrammatic, perspective view of a front cover of the box systems of FIGS. 4 and 5 showing resilient fingers for urging a printed insert against a reference line or a shallow side wall of a box for aligning the interlaced images of a printed insert with respect to the longitudinal axes of the lenticules of the invention.
Figure 32A:
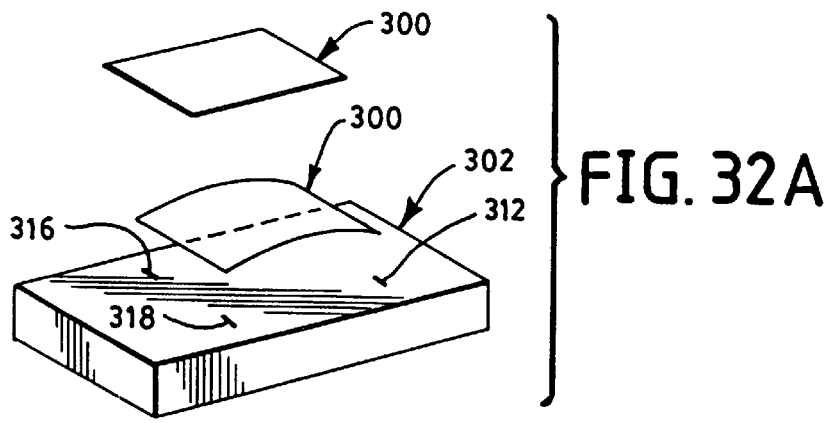
Figure 32B:
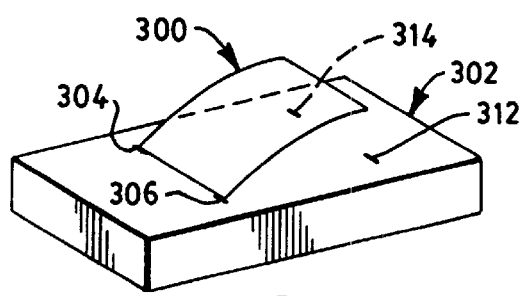
Figure 32C:
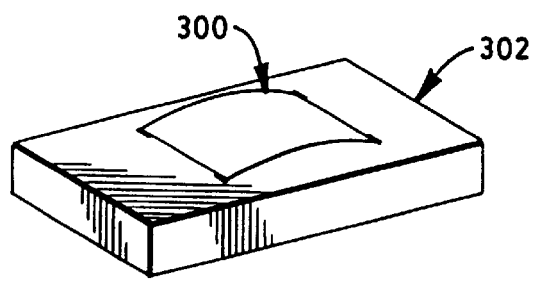
Figure 32D:
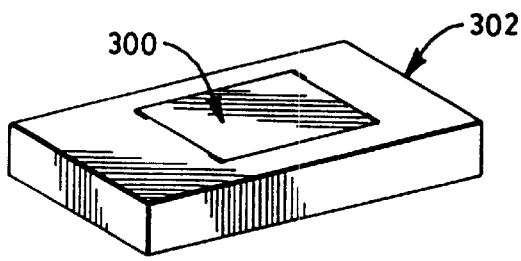
Figure 32E:
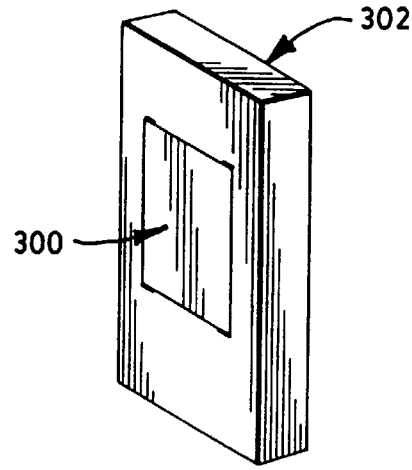

As best seen in FIG. 21, the height of vertical tab section 232 is dimensioned so that it positively urges a printed insert into the desired focal plane of the lenticules. In practice, this would depend on selecting the dimension that is appropriate for the minimum thickness for the range of anticipated printed inserts to be encountered in use.

With respect to the angular alignment of an insert in using the disc holder 200, one preferred way is to dimension the width of the printed inserts to that the clearance provided between their references edges 181 (FIG. 9) and the interior surface of the front cover shallow side walls is everywhere less than the allowed departure from parallelism over the length of the printed interlaced images. This approach would thus rely on fit between the side walls of the front cover and the width of a printed insert. As will be seen, there are other possibilities to be discussed.

Referring now to FIGS. 22–25, there is shown a novel front cover 250 that is provided with features for aligning printed material through the use of flexible tabs for both alignment with respect to the focal plane of lenticulated panels and proper angular alignment between the longitudinal axes of the interlaced images and the individual lenticules. Here, the clearance between the width of the printed inserts need not be tight because flexible members resiliently urge the insert into the desired alignment.

Front cover 250 includes a lenticulated panel 252 and a pair of opposed, shallow side walls 254 and 256. In side wall 254, there are provided three flexible tabs 258, 260 and 262 which are generally parallel to lenticulated panel 252, although aimed slightly downwardly, and in side wall 256, there are also three flexible tabs 264, 266, and 268 of similar construction. Also, in side wall 256 there are provided a pair of flexible arms 270 and 272 for side loading a printed insert against a reference line in side wall 254 defined by a pair of spaced apart bosses 274 and 276 against which reference edge 181 (FIG. 9) seats for angular alignment.

As best seen in FIGS. 26 and 27, a tab such as that at 268 has placed underneath it a portion of a printed insert as shown in FIG. 27. Because tab 268 is flexible, it holds the edge of the insert firmly against the focal plane of the lenticules and tends to otherwise flatten the central portions to bring them within acceptable tolerances for focus. If the central portion of the inserts sags because thin flexible inserts are anticipated, it is possible to use this scheme in combination with a flexible arm such at that at 228 in the hub 204 of disc holder 200 in FIG. 18. Alternatively, thicker, stiffer material may be used.

FIGS. 28 and 29 show the side loading action of flexible arms 270 and 272. As will be noticed, a slight undercut 274 is provided so that an insert cannot inadvertently slide underneath the arms and defeat their side loading function. Such arms could also be used in conjunction with the flexible lifter arrangement of FIG. 18 for focal plane alignment, and the fit approach discussed in connection with angular alignment in FIG. 18 could alternatively be used with the flexible tab approach advocated here.

It should be clear that front cover 250 could with minor modification be used as a stand alone display box for purposes of the invention, and it is intended that it be so considered. Simple removal of the pivots and the provision of a mounting hole, for example, would accomplish this.

FIG. 30 shows how embossing can be used in connection with the printed insert itself to provide alignment functions. As shown there a printed insert 280 is provided with four embossed sections 282–288, which are formed in well-known manners. The embossed sections are dimensioned and positioned so that they fit in the space between corresponding front cover tabs, which, as mentioned previously, is about 0.090 inches. This is best seen in the sectional view of FIG. 31. Obviously, this approach to focal plane alignment would work best with stiff printed inserts, but could be used with the central lifter of FIG. 18 for added assurance. In addition, the angular alignment can, as before be controlled by fit or the side loading scheme of FIG. 22 may beneficially be employed.

FIGS. 32 a–e show in sequence how a flexible lenticulated panel 300 may be connected with a specially configured box or display 302 on which are printed interlaced images. Here, box 302 may be for containing general merchandise, cereal, audio or video tapes, for example, or may simply be used as an otherwise empty pictorial display frame. Exemplary examples would include VHS cassette boxes or multi flapped CD holders where one flap represents the contents of the holder. What is essential is that one or more surfaces of such a box, or any surface for that matter, have interlaced images printed on it along with the corresponding registration holes.

As best shown in FIGS. 33 and 34, the flexible, lenticulated panel 300 is provided with four flexible clips 304–310 that insert into corresponding holes 312, 314, 316, and 318. The holes and the clips are dimensioned in the plane of the image carrying surface so that the angular alignment meets the criteria previously discussed. For a four inch long lenticule, other things being as for previous examples, the linear offset between the longitudinal axes of the interlaced images and the lenticules would be about 0.005 inches and as much as 0.010 inches over the four inch length, which could also be measured with respect to the interlaced image length where the lenticule length was longer. These tolerances can be met by die cutting the required holes and injection molding the clips to the desired precision.

Also, the length between clips is dimensioned so that there is a slight interference between the outer edges of the holes and the outer surfaces of the clip so as to force angular alignment. However, care must be taken to assure that the interference is not so much that it tends to bow the lenticular screen 300. Otherwise, it will not lie flat against the interlaced images.

In this connection, one of the clips may be foreshortened to that only three come into play for alignment purposes thus making the arrangement kinematic since there are no redundant forces competing in the alignment arrangement.

In the foregoing manner there is provided a flexible transparent plate having a lenticulated surface with a focal plane and a plurality of parallel adjacent lenticules having longitudinally extending axes. The clips are positioned on the flexible transparent plate to fit into registration holes when flexible transparent plate is bowed and attach the flexible transparent plate to the image bearing box surface so that the focal plane of the lenticulated surface overlies the printed interlaced images and the longitudinally extending axes of the interlaced images are parallel to within a predetermined fraction of the width of one of the lenticules over the length of the lenticulated section to provide distinctly different information from different angular perspectives of the transparent lenticulated section.

FIG. 35 shows yet another inventive arrangement for the display of sporting figures, celebrities, popular performers, or family members and the like. Here, a display box 320 is provided in the usual way of the invention with a lenticulated panel 324. In box 320, there is formed by any well-known manner, an elongated slot 326. A printed card 322 is provided in accordance with the teachings of the invention and has formed on it the necessary interlaced images 321 and reference edges. Slot 326 and printed card 322 are dimensioned in accordance with alignment requirements of the invention so that the fit between them dictates that printed card 322 resides within the depth of focus of lenticulated panel 324 and is otherwise angularly aligned properly.

Aside from tightly held tolerances to provide a snug fit between a printed insert and its supporting structure with respect to the lenticulated panel 324, looser tolerances may be employed. This may be done by dimensioning the width so that there is a loose fit widthwise between insert 322 and slot 326. In this approach, one edge of insert 322 may then be aligned with one side of slot 326 to angularly align the longitudinal axes of the interlaced images and the lenticules. Simply, physically tapping the edge display box 320 along one of its edges will accomplish this. Afterwards, insert 322 may be fixed in place by ultrasonically welding it to one of the surfaces of box 320, preferably. Alternatively, uv-curable epoxy may be used along the open edge of slot 326.

Box 320 is preferably molded in a clam shell configuration with a living hinge and well-known automatic attachment features which permit both sides of it to snap together while automatically forming slot 326 between them. Also, it is contemplated that both exterior surfaces of box 320 may be provided with lenticules in conjunction with both sides of insert 322 being provided with interlaced images so that either box side may project multiple or stereo images. In addition, the tolerances of box 320 and insert 322 are preferably set so that one insert 322 may be exchanged for another with different images.

Reference is now made to FIGS. 36 and 37 which show a display embodiment of the invention that has but one lenticulated surface. Here, the display frame is designated as 330 and is seen to comprise a lenticulated front panel 332 which does not cover its entire front surface 333 so there is surface area on surface area 333 that can be used for other display purposes such as a logo or business or trade name, or the like.

Extending from front surface 333 are a pair of opposed channels 334 and 336 for receiving a printed insert carrying interlaced images. Such an insert is designated at 340 which carries lenticulated images shown at 342. As seen, printed insert 340 also has edges 344 and 346 that snugly fit into grooves 334 and 336. The width between grooves 334 and 336 and the width and thickness of insert 340 are toleranced to properly align interlaced images with respect to lenticulated panel 332. A stop 338 is also provided to locate insert 340 along the length off channels 334 and 336.

FIG. 38 shows another variation of a display such as 330. Here, a display 350 is again provided with spaced apart channels 352 and 354 and a stop 356. As before, the fit of an insert card with respect to channels 352 and 354 establish the alignment between lenticules and interlaced images. However, this embodiment differs from preceding embodiments because it illustrates the principle that the lenticulated grooves and interlaced images need not be in a parallel of perpendicular orientation but, rather, need only be in a predetermined orientation. For example, lenticules 358 are at thirty degrees with respect to the vertical in FIG. 38, lenticules 360 are at forty-five degrees, and lenticules 362 are at sixty degrees.

Such rotated or tilted lenticules provide the opportunity to offer customized and proprietary artwork and lenses to differentiate customers. Clearly, boxes or displays designed to work at forty-five degrees can't "read" or "decode" printed inserts designed to work at other angles such as thirty or sixty degrees.

In addition to the orientation of the lenticules with respect to other reference features of displays, boxes, and printed materials, it is also contemplated, along with lenticular orientation, that the spatial frequency of the lenticules can be made different for different angular orientations to provide any number of combinations. For example, lenticular frequencies of 50, 60, 72, and 75 lenticulars per inch combined with lenticular angular orientations of 0.15, 30, 45, 60, 75, and 90 degrees result in 28 different possible combinations. For other sensible combinations, it is estimated that there are in excess of 100 possible combinations.

FIGS. 39 $a$ through $d$ illustrate yet another embodiment of the invention. Here, a flexible lenticulated panel or member 400 is connected with a specially configured box or display 402 which has a folding flap or cover 404 on which are printed interlaced images. Lenticulated panel 400 slides on to flap 404 in a manner to be described using a guide and rail arrangement that automatically aligns lenticulated panel 400 with the interlaced images carried on the outwardly facing surface of flap 404.

Box 402 may be for containing general merchandise but is preferably for use with video or audio cassettes, or may simply be used as an otherwise empty pictorial display frame. Exemplary examples would include VHS cassette boxes or multi flapped CD holders where one flap represents the contents of the holder. What is essential is that one or more surfaces of flap 404 of box 402 have interlaced images printed on it along with the corresponding means for facilitating optical alignment between optics and interlaced images. It is to be noted that lenticulated panel 400 may also have two spaced apart walls each of which carry lenticulated optical elements in the case where the two surfaces of flap 404 are provided with interlaced images.

As best shown in FIGS. 41 ($a$–$d$), flap 404 comprises a printed panel 406 connected with a panel 408 which is, in turn connected to the remainder of box 402 via a hinge 412. Panel 406 folds onto panel 408 in the manner of FIG. 41 and is preferably glued thereto. As can be seen, the height of panel 408 is shorter than that of panel 406 so that when the two are fixed in place the form a rail sections as shown at 410 in FIG. 42, one upper and one lower for each edge of flap 404. The interlaced images are printed on the outwardly facing surface of panel 406 when folded in the foregoing manner.

Referring now to FIG. 40, it can be seen that lenticulated panel 400 is provided with upper and lower guide sections, one of which is indicated at 412. Each guide section 412 is provided with a groove as shown into which a corresponding rail section 410 fits to align and attach lenticulated panel 400 to image carrying flap 404. Preferably, either the upper or lower edge of one of rail sections 410 serves as a reference edge for interacting with one of the grooves in guide section 412 while the other edge of rail section 410 is slightly crowned to provide for kinematic alignment by interacting with the remaining groove.

As can be seen in FIG. 39 ($d$), lenticulated panel 400 can be attached to flap 404 via the foregoing guide and rail arrangement by sliding it on while flap 404 is extended or by sliding it on while flap 404 is folded against the remainder of box 402. To prevent lenticulated panel 400 from sliding off flap 404, it is provided with a pair of opposed flanges, 414 and 416, (see FIG. 39 (d). Flanges 414 and 416 are preferably spaced to provide a loose lateral fit between lenticulated panel 400 and the interlace images so that there is no tilt introduced between the two because of an over constrained system.

As shown in FIG. 43, box 402 is preferably first printed on a rectangular piece of suitable stock 420. The layout of box 402 is shown as a development prior to die cutting. It can be seen that panel 406 carries interlaced image section 418 and that panels 406 and 408 differ in height by an offset 424 to provide rail sections 410. A reference line 422 is provided to assist in cutting such that the interlaced image section 418 is aligned with one of the free cut out edges of panel 406, and it will be understood that reference edge may also be placed in image carrying area 418 as part of it.

Panels 426, 428, 430, 432, and glue flap 420 are folded in the usual manner to provide the container section of box 402. Thus, box 402 is printed as a flat developed layout which, after die cutting, is folded as a single piece with a single glue seem without further assembly required. Of course, flap 404 may be separately printed and formed and attached in place by gluing or other suitable attachment means afterwards. All tolerances are dimensioned in the plane of the image carrying surface so that the angular alignment meets the criteria previously discussed. For a four inch long lenticule, other things being as for previous examples, the linear offset between the longitudinal axes of the interlaced images and the lenticules would be about 0.005 inches and as much as 0.010 inches over the four inch length, which could also be measured with respect to the interlaced image length where the lenticule length was longer. These tolerances can be met by die cutting edges and injection molding the rail and lenticulated sections to the needed precision.

Referring now to FIG. 44 (c), there is shown another box assembly 500 comprising a folded box 502 having an interlaced image bearing surface to which is slidably attached a lenticulated panel 506. Box 502, does not have a hinged flap as previously described, but rather has its rails formed directly in one of its surfaces of development by dinking out relief areas into which rail sections fit. The relief areas are designated at 512 and 514 (See FIG. 45) and the corresponding guide sections at 505 and 507 (See FIG. 44 (a)). The exposed free edges of relief areas 512 and 514 serve the rail functions of previously described and the guide are of similar grooved construction. Lenticulated panel 506 is provided in the usual way with vertically oriented lenticules 508, and interlaced images are printed at 512 on panel 510 (See FIG. 46).

The free edges of relief areas 512 and 514, which serve as image locating and alignment rails, are foreshortened from overall vertical dimension of box 502 by offsets 516 and 518, respectively, (See FIG. 45). Offsets 516 and 518 are sized to receive guide sections 505 and 507 so that lenticulated panel lies flush with panel 510, against interlaced images 512, and the overall size of box 502 remains substantially the same as a conventional box such as that for a VHS video cassette.

Referring now to FIG. 46, it can be seen that box 502 and interlaced images 512 are simultaneously printed, as before, on a rectangular piece of paper stock 530. To assist sliding lenticulated panel onto the rail sections of relief areas 512 and 514, a pair of opposed slots are provided at 532 and 534, and these permit the introduction of the rails into the grooves of guide sections 505 and 507.

The remaining sides of box 502, namely, sides 540 through 554, are folded in the conventional way after die cutting with flap 540 serving as the glue surface to form the final edge. As before, a reference line 560 is provided for alignment purposes, and other images or information may be provided on the remaining surfaces in the conventional way.

With this embodiment, it is also possible to provide more than two relief areas so that more than one lenticulated panel may be slidably attached, and they may be oriented in different angular attitudes, such as horizontally and vertically, or along skewed angles.

Reference is now made to FIG. 47 which shows a display embodiment of the invention that has but one lenticulated surface. Here, the display frame is designated as 600 and is seen to comprise a lenticulated front panel 608 having a lenticulated section 609 of some what smaller size. Here again, the unlenticulated surface can be used for other display purposes such as a logo or business or trade name, or the like.

A pair of parallel grooved guide sections 610 and 612 are sized to slideably receive the outboard edges of image carrying substrate 604 that carries interlaced images 606. The orientation of interlaced images 606, their content, and lenticulated section 609 are such that, when moved relative to one another, an observer is provided with an animation when viewing from one perspective.

Reference is now made to FIG. 48 which shows another form for a lenticulated panel of the invention. As before, a lenticulated panel 650 is injection molded of a transparent plastic in a well-known manner and includes a flat, lenticulated front panel 652 having a plurality of adjacent lenslets 654 in the form of a regular array or mosaic. Lenslets 654 operate as before to provide a plurality of informational views that in general are angularly separated vertically and horizontally in planes that are perpendicular to orthogonal axes of lenslets 654.

As can be appreciated, each lenslet 654 operates in a well-known manner as a convex lens to project an image segment from associated image segments corresponding to predetermined azimuths and elevations. Thus, there is a one-to-one mapping between individual image segments, also arranged in a two-dimensional array or mosaic, and corresponding angular viewing perspectives. For this mapping function, individual lenslets 654 preferably are made in the form of a truncated sphere as shown in FIG. 49. Each truncated sphere includes a convex front surface 656, preferably spherical, but aspherical in shape if requirements demand such a shape. Facing front surface 656 is a piano rear surface 658. In transverse cross-section the truncated sphere may be rectangular or square. To form the necessary mold inserts for replicating such shapes, use may be made of a variety of well-known techniques as, for example, diamond point grinding or step and press mastering. For more detail on the operation of such two dimensional embodiments, reference may be had to U.S. patent application Ser. No. (Case No. 0134/US/FJC) filed on Dec. 23, 1996, which is specifically incorporated in its entirety herein by reference.

It will be apparent that the two-dimensional arrays or mosaics of lenslets and corresponding image segments may be used instead of purely lenticulated panels in each of the embodiments described herein above.

It should also be understood that it is not necessary to form the lenticulated wall sections of the invention as unitary structures integrated with structural walls themselves since it is within the teaching of the invention to attach separately formed lenticulated wall sections to otherwise smooth wall sections by using suitable adhesives or other means of attachment. Moreover, it will be understood that the lenticulated structures of the invention, including compensation for parallax effects, may be integrated with the front, back, and side wall surfaces along with interior surfaces, such as disc carriers, as well. In addition, it should be realized that the flexible lifters and side arms for resiliently urging printed inserts into their alignment positions with respect to the focal plane and longitudinal axes of the lenticules need not be confined to use in just jewel box configurations since it is entirely possible to incorporate them into base or front covers or the like rather than disc holders. Moreover, it will be recognized that lenticules or lenslets may be arranged at any angle with respect to a reference line or surface since all that is required in this connection is to have the interlaced images rotationally aligned with respect to the axes of the lenticules. In this connection, the printed materials need not be perfectly rectilinear; what is essential is that they be of predetermined geometry and thickness and weight. Consequently, it is entirely within the scope of the invention to have lenticules oriented at, say, forty-five degrees with respect to a box or display side.

Those skilled in the art may make other changes to the invention without departing from the scope of its teachings. Therefore, it is intended that the embodiments described herein be considered as illustrative and not be construed in a limiting sense.

What is claimed is:

1. A box system for displaying visual information, said box system comprising:
    a multi-sided box having panels, said multi-sided box having at least one image bearing panel with printed interlaced images formed thereon on at least one surface thereof; and
    a transparent member having at least one wall having at least one lenticulated surface comprising a plurality of adjacent lenticular optical elements having axes and a focal plane and, said image bearing panel and said transparent member having complementary configured means for releasably attaching said lenticulated surface to said image bearing panel in overlying relationship to said printed interlaced images and in optical registration therewith so that an observer of said transparent lenticulated surface is provided with distinct visual effects when viewing said interlaced images through said transparent lenticulated section, said complementary configured releasably attaching means comprising a guide and rail arrangement and said transparent member has spaced apart grooved end sections and said image bearing panel has correspondingly spaced apart rail sections that fit into said grooved end sections to permit said transparent member to be slid onto said image bearing panel and registered therewith, at least one corresponding pair of grooves and rails serving as a reference edge for aligning said lenticular optical elements with said interlaced images along at least one direction.

2. A box system for displaying visual information, said box system comprising:
    a multi-sided box having panels, said multi-sided box having at least one image bearing panel with printed interlaced images formed thereon on at least one surface thereof; said multi-sided box being printed on a single side of printable material as a developed layout which, when die cut and folded, defines said multi-sided box; and
    a transparent injection molded plastic plate having at least one wall having at least one lenticulated surface comprising a plurality of adjacent lenticular optical elements having axes and a focal plane and, said image bearing panel and said transparent injection molded plastic plate having complementary configured means for releasably attaching said lenticulated surface to said image bearing panel in overlying relationship to said printed interlaced images and in optical registration therewith so that an observer of said lenticulated surface is provided with distinct visual effects when viewing said interlaced images through said lenticulated section.

3. The box system of claim 1 wherein said interlaced images are stereo perspectives.

4. The box system of claim 1 wherein said interlaced images represent distinctly different information when viewing said transparent lenticulated surface from different angular perspectives.

5. The box system of claim 1 wherein said image bearing panel comprises a flap hingedly attached to one other panel of said multi-sided box.

6. The box system of claim 1 wherein one of said grooves and a corresponding rail are configured to have line contact while the remaining rail is slightly crowned to coact with its corresponding groove to provide kinematic mounting of said transparent plate to said image bearing panel.

7. The box system of claim 2 wherein said multi-sided box is formed with a single joint along adjacent edges of two of said sides of said multi-sided box.

8. The box system of claim 2 wherein said lenticulated optical elements comprise a plurality of adjacent elongated parallel lenticules and said interlaced images comprise a corresponding plurality of adjacent elongated parallel image segments.

9. The box system of claim 2 wherein said lenticulated optical elements comprise a plurality of lenslets arranged in a two-dimensional array and said interlaced images comprise a corresponding two-dimensional array of image segments to provide multi-dimensional image effects.

10. The box system of claim 2 wherein said lenticulated optical elements are structured and arranged to correct for off-axis visual parallax effects.

11. The box system of claim 2 wherein said box is open ended and its sides define a product cavity that is sized to receive a video cassette through said open end.

12. A box system for displaying visual information, said box system comprising:
    a multi-sided box having at least one panel bearing printed interlaced images and having formed therein a plurality of registration holes that are positioned in a predetermined relationship with respect to said plurality of interlaced images; and
    a flexible transparent plate injection molded of plastic having formed therein a plurality of clips and a lenticulated surface comprising a plurality of parallel adjacent lenticules having longitudinally extending axes and a focal plane, said clips being positioned on said flexible transparent plate to fit into said registration holes when said flexible transparent plate is bowed and to attach said flexible transparent plate to said panel when said flexible transparent plate is relaxed so that said focal plane of said lenticulated surface overlies said printed interlaced images and said longitudinally extending axes of said lenticules are in a fixed angular relationship, within a predetermined fraction of the width of one of said lenticules over the length of said interlaced images, with respect to said interlaced images so that an observer of said transparent lenticulated section is provided with distinctly different information when viewing said transparent lenticulated section from different angular perspectives.

13. The box system of claim 12 wherein said lenticules are corrected for parallax effects.

14. The box system of claim 12 wherein said lenticules are formed on a front surface of said flexible transparent plate while said clips extend from a rear surface thereof.

15. The box system of claim 14 wherein said focal plane is located substantially at said rear surface.

16. A box system for displaying visual information, said box system comprising:

information bearing media of predetermined geometry and thickness, said information bearing media having printed on at least one surface thereof a plurality of interlaced images and having one edge that serves as a reference edge and has a given angular orientation to within a given tolerance with respect to said interlaced images;

at least one flat wall having at least one major dimension, said flat wall having at least one transparent lenticulated section optically associated therewith, said transparent lenticulated section having arranged thereon a plurality of lenticular elements whose foci collectively substantially reside in a focal plane and have a given depth of focus;

a plurality of shallow side walls connected with said flat wall and having dimensions that are substantially smaller than said major dimension of said flat wall; and means positioned in said plurality of shallow side walls for releasably holding said information bearing media with respect to said flat wall and at least one of said shallow side walls so that said information bearing media is located in a position of alignment with respect to said transparent lenticulated section such that said interlaced images are located within said depth of focus of said lenticules and said reference edge is in said fixed angular orientation, within a predetermined fraction of the width of one of said lenticules over the length of said interlaced images and with respect to the axes of said lenticular elements, said information bearing media and said transparent lenticulated sections being relatively moveable with respect to one another in a plane substantially containing said focal plane so that an observer of said transparent lenticulated section is provided with distinct animated visual effects when viewing said transparent lenticulated section while said interlaced images and said transparent lenticulated section are moved relative to one another.

17. The box system of claim 16 wherein said transparent lenticulated section is corrected for parallax effects.

18. The box system of claim 16 wherein said holding means comprises flexible sections for resiliently urging said information bearing media into alignment with respect to said transparent lenticulated section.

19. The box system of claim 16 wherein said holding means comprises a pair of spaced apart channel sections dimensioned with respect to said predetermined geometry and thickness of said information bearing media to provide a snug fit therewith for purposes of aligning said interlaced images with respect to said transparent lenticulated section.

20. The box system of claim 16 further including another flat wall opposed so said one flat wall and in combination with said shallow side walls defining a slot therebetween for receiving said information bearing media, said slot being dimensioned with respect to said predetermined geometry and thickness of said information bearing media to provide a snug fit therewith for purposes of aligning said interlaced images with respect to said transparent lenticulated section.

21. The box system of claim 20 wherein both of said flat walls include lenticulated sections and said information bearing media comprises printed interlaced images on opposed surfaces thereof for providing different views on both sides of said box system.

22. The box system of claim 16 wherein said lenticulated section is comprised of portions having different angular orientations with respect to said interlaced images.

23. The box system of claim 16 wherein said lenticulated section and the interlaced images of said information bearing media have portions that are at different spatial frequencies with respect to other portions.

24. The box system of claim 16 wherein all of the walls of said box system are molded of transparent plastic and said lenticules are formed on a front surface thereof.

25. The box system of claim 16 wherein said lenticulated elements comprise a plurality of lenslets arranged in a two-dimensional array.

* * * * *